(12) United States Patent
Faber et al.

(10) Patent No.: US 7,699,515 B2
(45) Date of Patent: Apr. 20, 2010

(54) LED LIGHTING SYSTEM

(75) Inventors: Stephen Faber, Orlando, FL (US); Paul Koren, Altamonte Springs, FL (US)

(73) Assignee: Nexxus Lighting, Inc., Charlotte, NC (US)

( * ) Notice: Subject to any disclaimer, the term of this patent is extended or adjusted under 35 U.S.C. 154(b) by 22 days.

(21) Appl. No.: 11/851,605

(22) Filed: Sep. 7, 2007

(65) Prior Publication Data

US 2009/0067191 A1 Mar. 12, 2009

(51) Int. Cl.
*F21V 5/00* (2006.01)
(52) U.S. Cl. ..................... 362/580; 362/555
(58) Field of Classification Search .............. 362/555, 362/580
See application file for complete search history.

(56) References Cited

U.S. PATENT DOCUMENTS 6,120,161 A * 9/2000 Van Der Bel .............. 362/105

2007/0097702 A1 * 5/2007 Crowder .................... 362/570
2008/0259631 A1 * 10/2008 Holder et al. .............. 362/554

FOREIGN PATENT DOCUMENTS

WO WO 02099332 A1 * 12/2002

* cited by examiner

*Primary Examiner*—David V Bruce
(74) *Attorney, Agent, or Firm*—McGuireWoods LLP

(57) ABSTRACT

A lighting system is provided having a light source with a housing, an LED engine, a controller, a heat sink, a connection device, and a power cable opening. The LED engine, controller and heat sink can be enclosed by the housing and sealed from atmosphere. The heat sink can be in thermal communication with the LED engine. The controller can be connected to a power cable inserted through the power cable opening. The controller can control at least one of power to the LED engine and a light output generated by the LED engine. A fiber optic cable can be connected to the LED engine by the connection device. The LED engine can communicate the light output through the fiber optic cable.

23 Claims, 24 Drawing Sheets

LOOP OR DOUBLE PUMP

STRAIGHT RUN

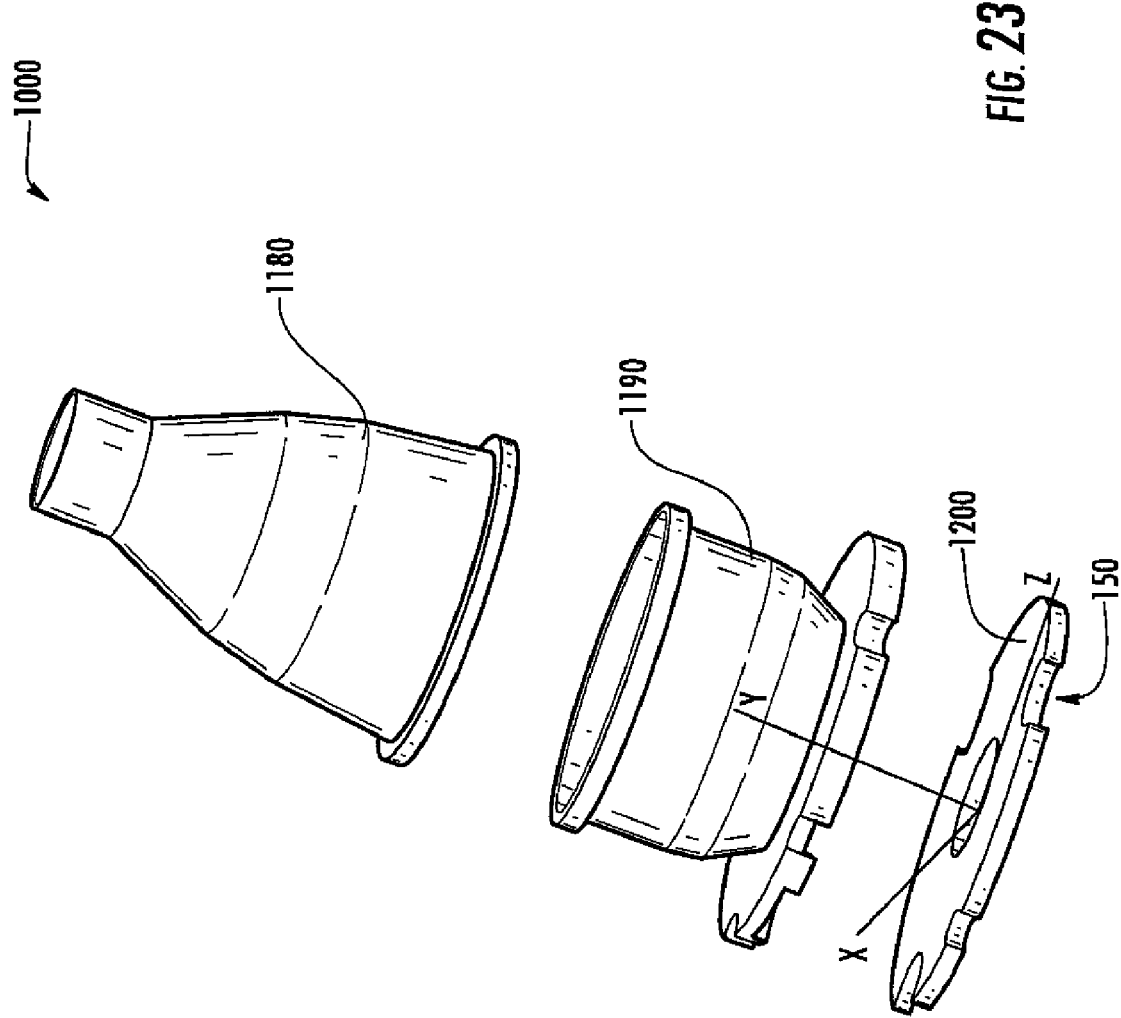

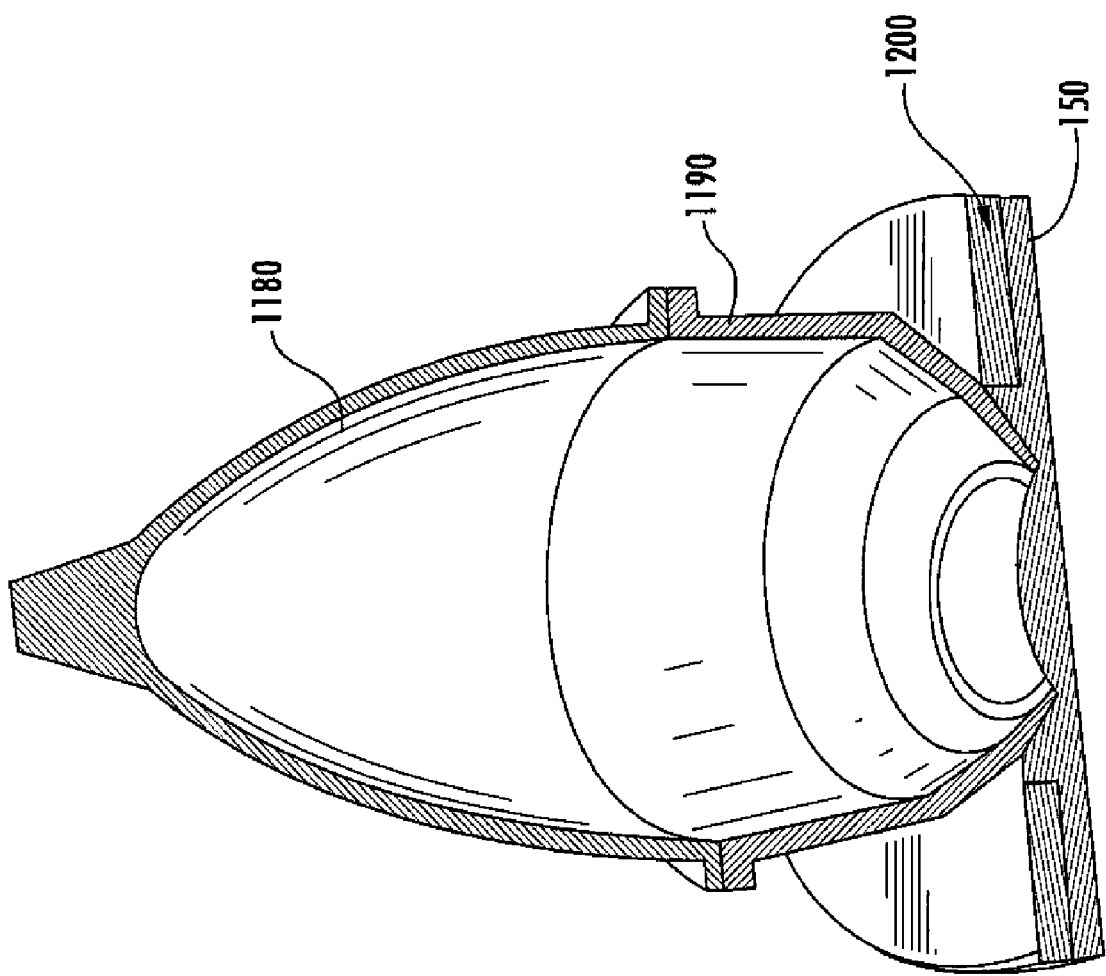

LED LIGHTING SYSTEM

FIELD OF THE INVENTION

This invention is directed generally to light emitting diodes (LEDs), and more particularly, to LEDs for use with fiber optics.

BACKGROUND OF THE INVENTION

Generating visible light with traditional light sources, such as incandescent or fluorescent light sources, can be inefficient because a large amount of thermal energy is also produced as a by-product of the process. The wasted thermal energy is generally directed away from the light source in the direction of the radiant beam of light. Fixtures such as light shades or reflectors, or even the target illuminated by the light source, receive the wasted thermal energy, and consequently, rise in temperature. In some instances, the rise in temperature can reduce the useful life of a product. Further, the arrangement of traditional light sources are limited to designs that can withstand the wasted thermal energy.

It is known to use fiber optic cables for lighting (e.g., underwater lighting). The fiber optic systems typically utilize sources of light that are not strong enough to produce a desired effect over the fiber optic system. The sources may also not be well suited to the environment where the fiber optic system is situated (e.g., outdoors or exposed to the elements).

In contrast to traditional light sources, solid state lighting, such as light emitting diode (LED) fixtures, are more efficient at generating visible light than many traditional light sources. However, single LED lights are typically not bright enough for illuminating objects, such as for use in pool and other underwater lighting. Although LEDs do not generally radiate heat in the direction of the beam of light produced, implementation of LEDs for many traditional light source applications has been hindered by the amount of heat build-up within the electronic circuits of the LEDs. Heat build-up reduces LED light output, shortens lifespan, and can eventually cause the LEDs to fail.

Accordingly, there is a need for a lighting system and method that provides sufficient illumination to produce a desired effect. There is a further need for such a system and method that is better suited for the environment where the system is situated. There is yet a further need for such a system and method that provides sufficient thermal management to maintain light output and/or increase lifespan for the light source.

SUMMARY OF THE INVENTION

In a first exemplary embodiment in accordance with inventive aspects of the present disclosure, a lighting system is provided having a light source with a housing, an LED engine, a controller, a heat sink, a connection device, and a power cable opening. The LED engine, controller and heat sink can be enclosed by the housing and sealed from atmosphere. The heat sink can be in thermal communication with the LED engine. The controller can be connected to a power cable inserted through the power cable opening. The controller can control at least one of power to the LED engine and a light output generated by the LED engine. A fiber optic cable can be connected to the LED engine by the connection device. The LED engine can communicate the light output through the fiber optic cable.

In another exemplary embodiment in accordance with inventive aspects of the present disclosure, a light source for a lighting system is provided. The light source can include a housing, an LED engine, a controller, a heat sink, a fiber lens, a power cable opening, and a connection device. The LED engine, controller, fiber lens and heat sink can be enclosed by the housing. The heat sink can be in thermal communication with the LED engine. The controller can be connected to a power cable inserted through the power cable opening. The controller can control at least one of power to the LED engine and a light output generated by the LED engine. The LED engine and the fiber lens can be connected to a fiber optic cable by the connection device. The LED engine can communicate the light output through the fiber optic cable. The fiber lens can focus the light output generated by the LED engine.

In yet another exemplary embodiment in accordance with inventive aspects of the present disclosure, a method of providing light output for a lighting system is provided. The method can include enclosing and sealing an LED engine, a controller, a heat sink, and a fiber lens in a housing of a light source, where the heat sink is in thermal communication with the LED engine; connecting a power cable to the controller through a power cable opening in the housing; connecting a fiber optic cable to the LED engine and the fiber lens using a connection device extending outside of the housing; and controlling power to the LED engine and a light output generated by the LED engine. The LED engine can communicate the light output through the fiber optic cable. The fiber lens can focus the light output generated by the LED engine.

These and other arrangements and advantages are described in relation to the accompanying drawings.

BRIEF DESCRIPTION OF THE DRAWINGS

There are shown in the drawings embodiments which are presently preferred, it being understood, however, that the invention is not limited to the precise arrangements and instrumentalities shown.

FIG. 23 is an exploded perspective view of a portion of another lighting assembly according to the inventive arrangements.

FIG. 24 is a cross-sectional view of the portion of the lighting assembly of FIG. 23.

DETAILED DESCRIPTION OF THE DRAWINGS

Figure 1:
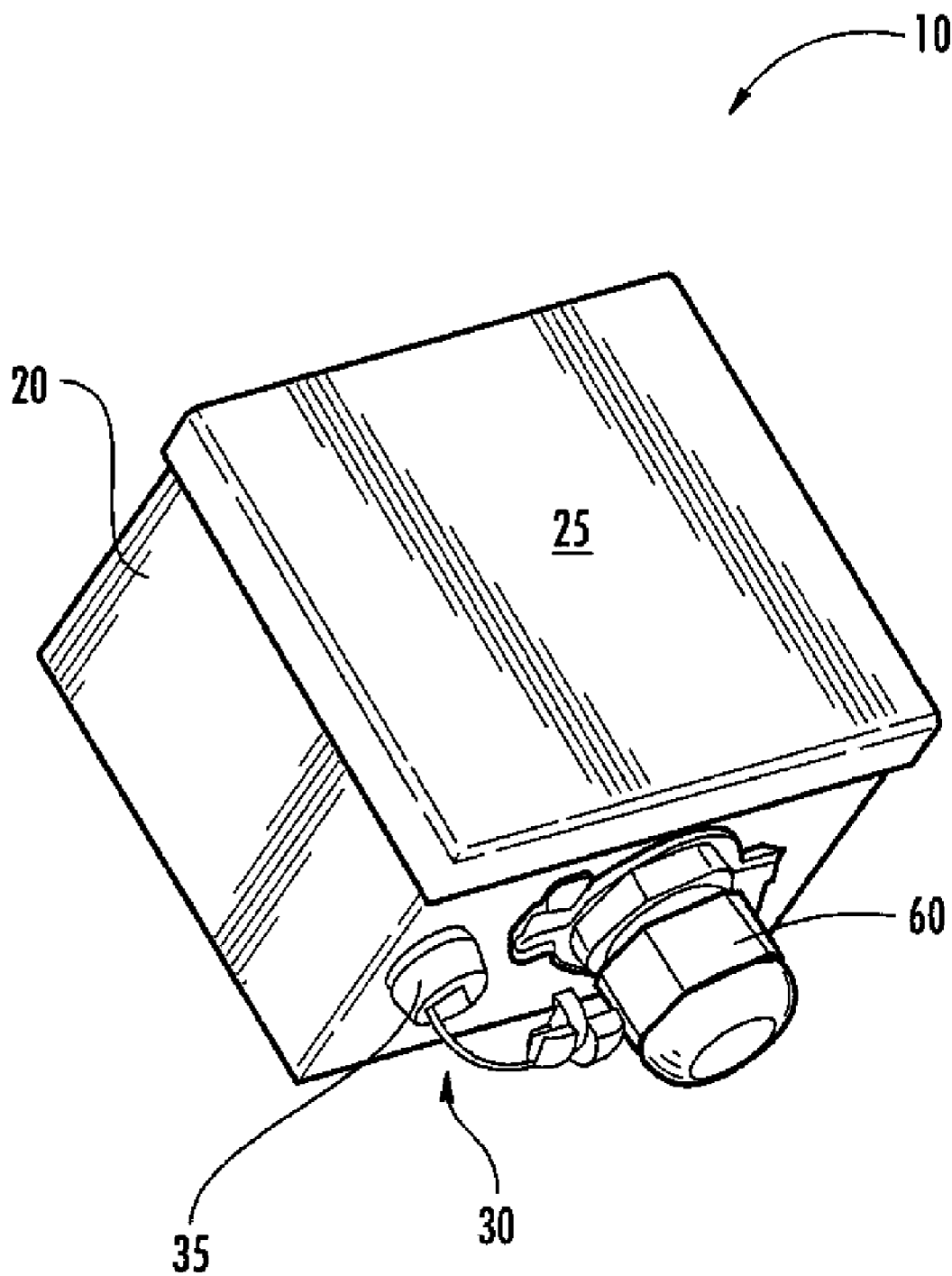
FIG. 1 is a perspective view of a light source for a fiber optic system according to the inventive arrangements.
Figure 2:
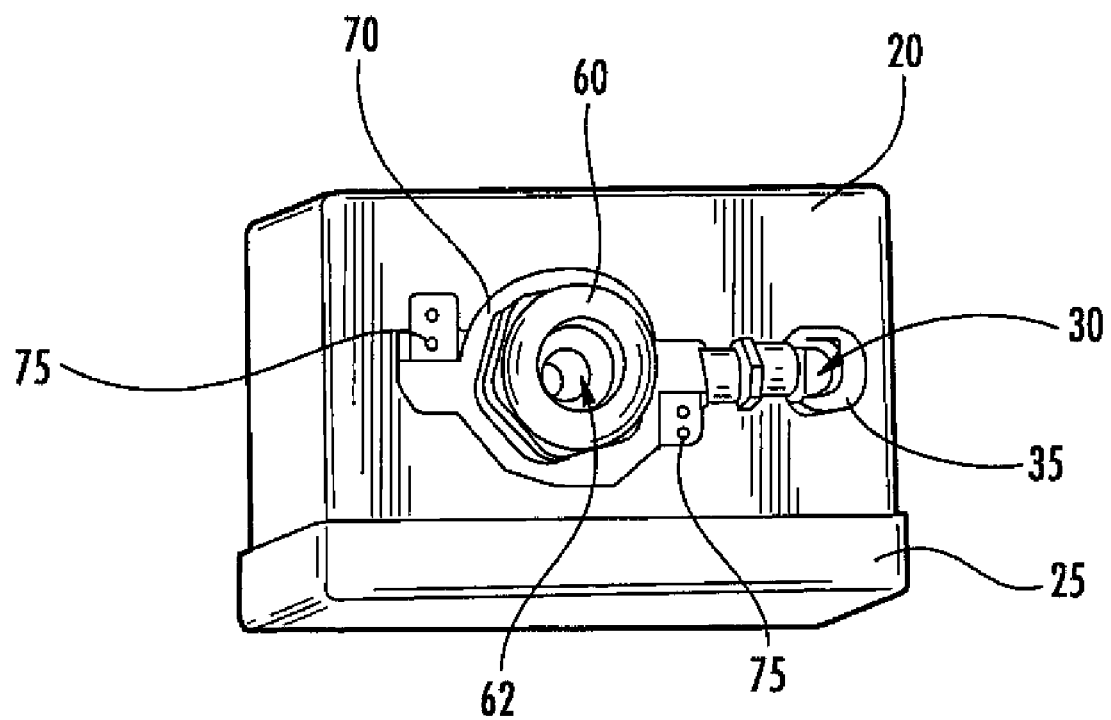
FIG. 2 is another perspective view of the light source of FIG. 1.
Figure 3:
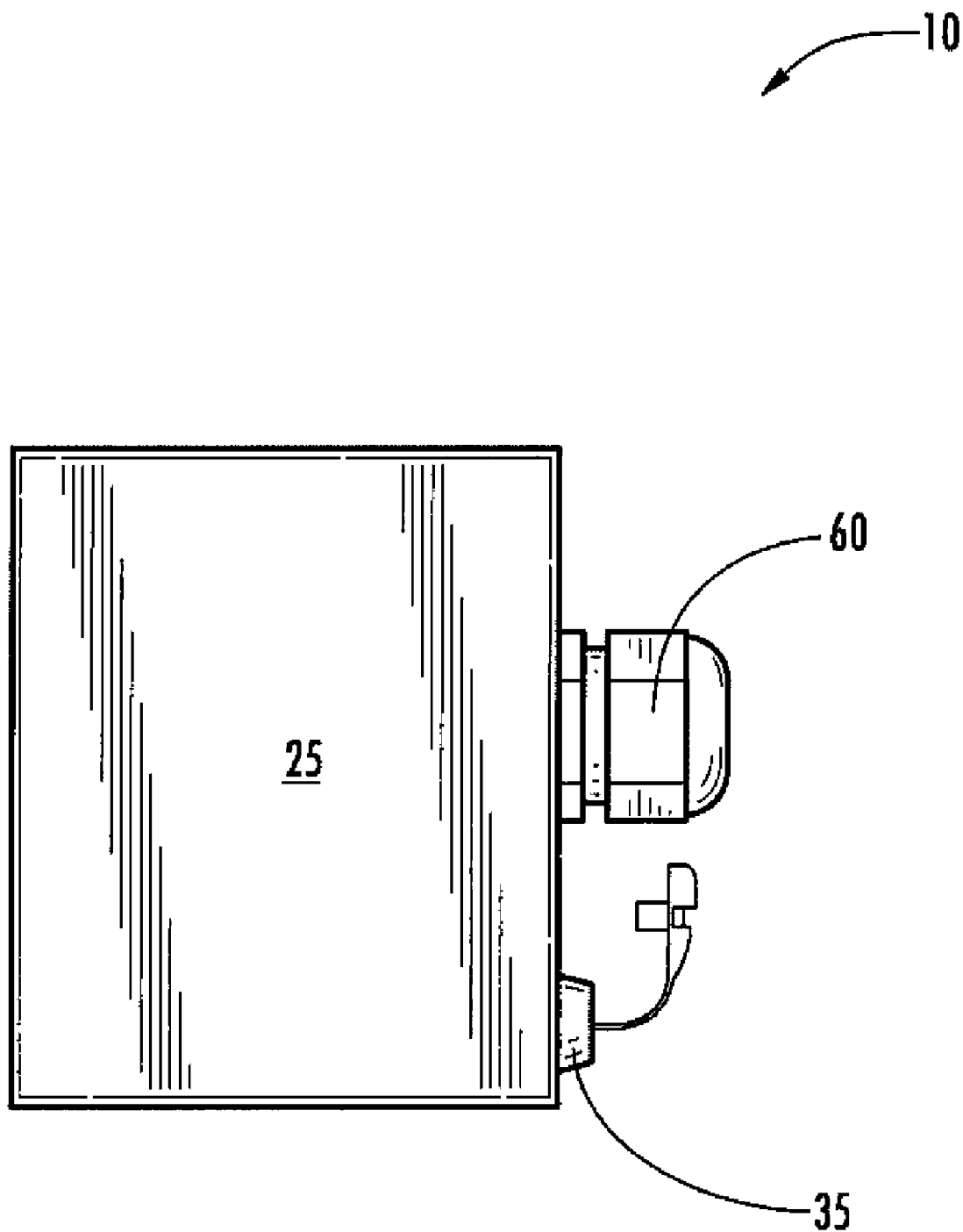
FIG. 3 is a plan view of the light source of FIG. 1.
Figure 4:
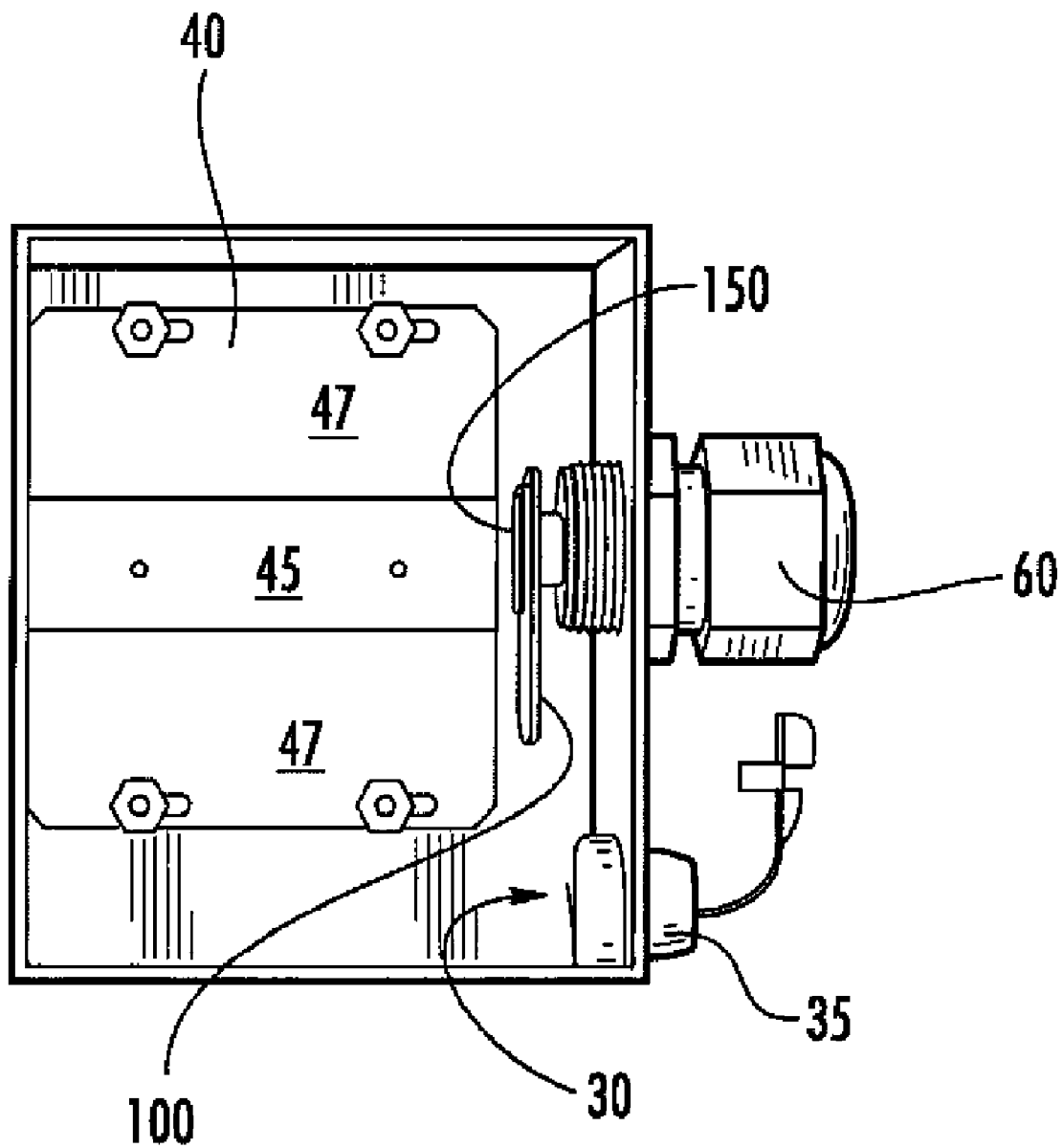
FIG. 4 is perspective view of the light source of FIG. 1 with a cover and gasket of the housing removed.
Figure 5:
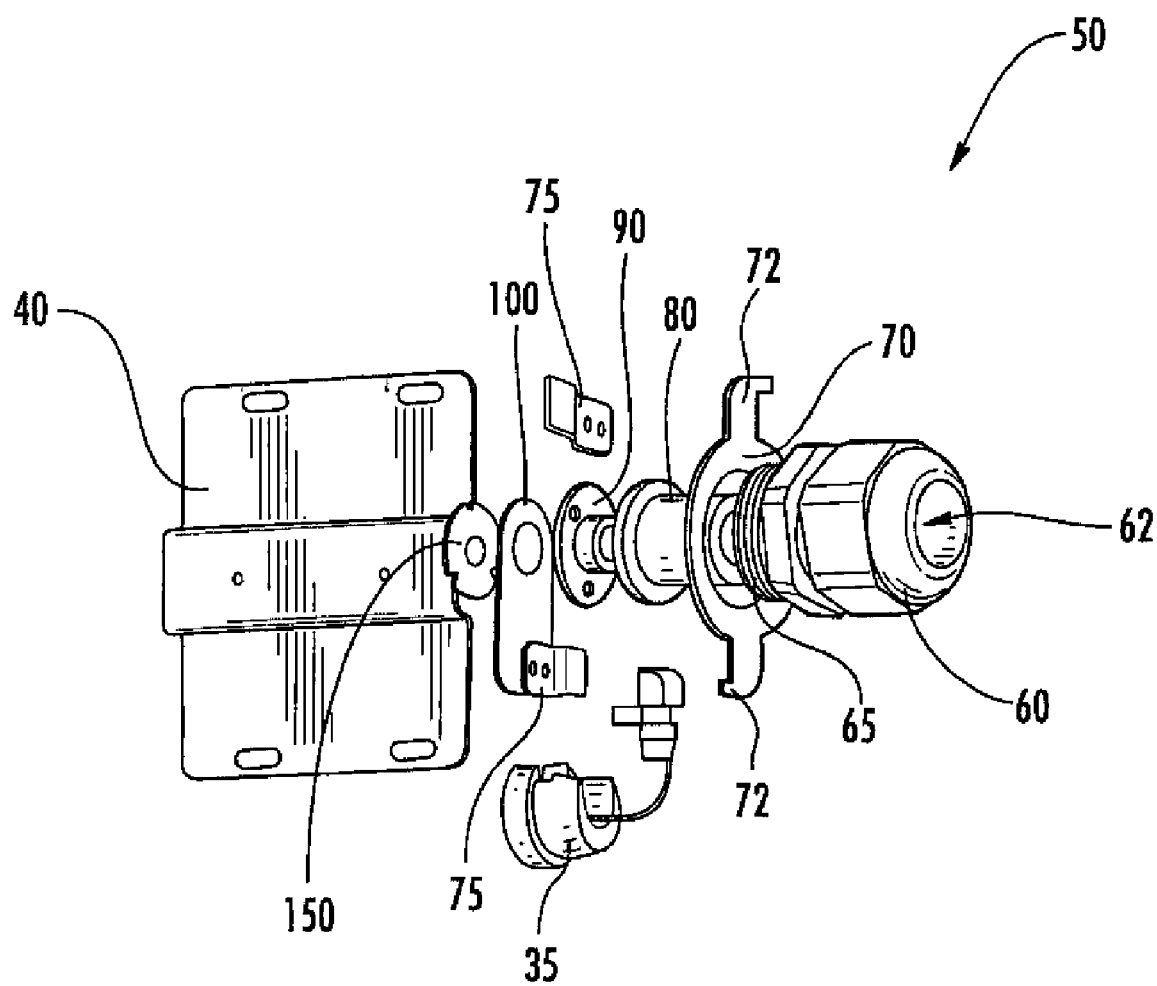
FIG. 5 is an exploded perspective view of the light source of FIG. 1 without the housing.
Figure 6:
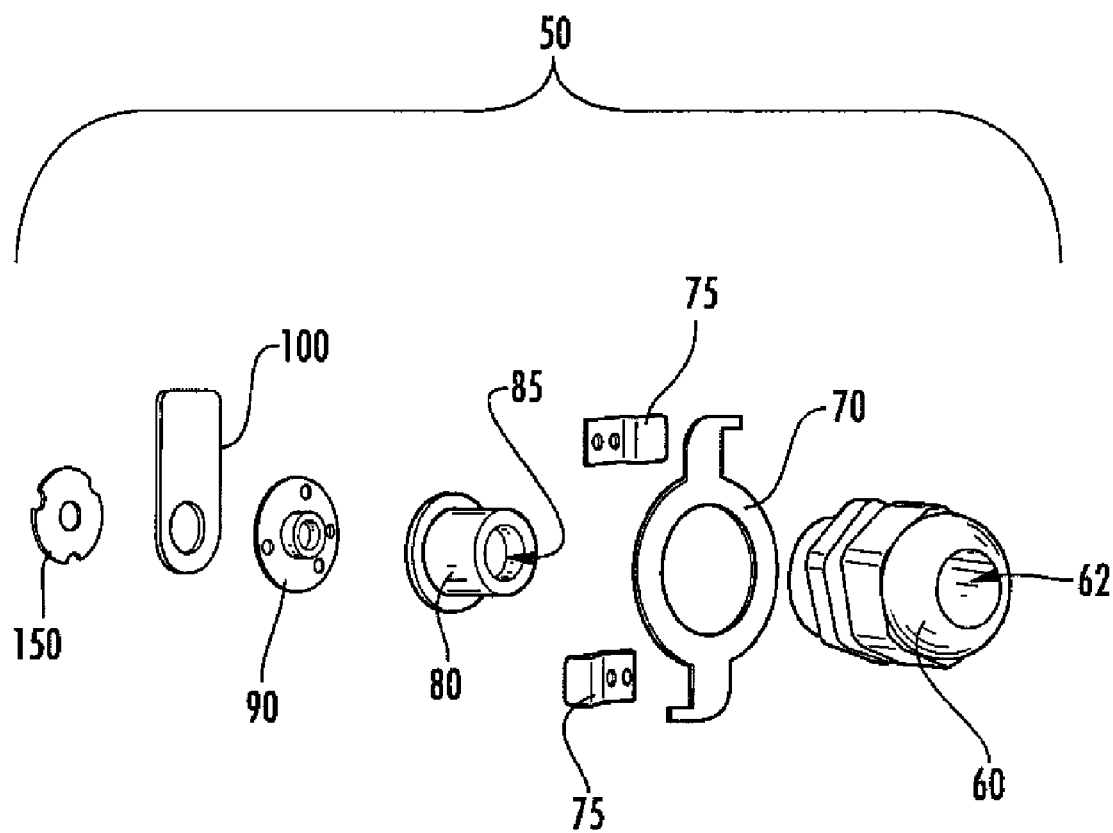
FIG. 6 is an exploded view of a portion of the light source of FIG. 1.

The present disclosure provides light emitting diode (LED) light sources, and more particularly, LED light sources that can be used with fiber optic systems, such as around swimming pools, spas and the like. It will be appreciated that the LED light sources can be used in any suitable application, such as swimming pools, spas, fountains, sinks, waterfalls or any other water feature, and is not limited in this regard.

An arrangement of an exemplary embodiment of the present disclosure is illustrated in the accompanying drawings. For example, FIGS. 1-6, show an LED light source, which is generally represented by reference numeral 10. The light source 10 can include a housing or enclosure 20, which can be mounted or positioned by various structures and techniques, including fasteners, clips, brackets and the like. Various modifications can be made to the housing 20 or other structures can be coupled with the housing to provide for positioning of the light source 10. In one embodiment, the light source 10 can be mounted above-ground, which provides for easy access, such as to facilitate maintenance. In another embodiment, the light source 10 can be buried underground, which may or may not require other mounting structure.

The housing 20 can include a removable cover 25 and various sealing mechanisms or structure, such as a gasket (not shown), to provide protection against the elements. In one embodiment, the housing 20 with cover 25 and/or gasket can provide a water-tight seal for the inner volume of the light source 10. The cover 25 can provide for access to the inner volume of the housing 20 where other components of the light source 10 are housed. Various materials and combinations of materials can be used for the housing 20, including aluminum and plastic (e.g., injection molded plastic).

The light source 10 can include a power/control portal or opening 30, a heat sink 40 and a lighting assembly 50. The portal 30 can be an opening formed in a wall of the housing. In one embodiment, the portal 30 can be a plurality of push-out regions (e.g., weakened regions in the wall of the housing 20 that allows for creating an opening by applying force thereto and breaking away the push-out region) that are positioned along various walls of the housing 20 to facilitate connection of the lighting assembly 50 with a power source and/or a controller. The portal 30 can have a conduit guide 35, such as a tethered guide, to allow for insertion of a cable through the portal 30, and positioning of the cable through use of the guide. In one embodiment, the conduit guide 35 can be a sealing mechanism so that if the portal 30 is not being used (e.g., a push-out region or other opening formed in the housing is being utilized for access to the inner volume by the cable for the power source and/or controller) then the portal can be sealed by insertion of the tethered guide therein.

A heat sink 40 can be positioned in the inner volume of the housing 20 to draw heat away from the components of lighting assembly 50. In one embodiment, the heat sink 40 can be a single plate mounted along a wall of the housing 20. The heat sink 40 can extend along a substantial portion of the wall of the housing 20 so that heat is transferred throughout the heat sink and removed from the lighting assembly 50. The heat sink 40 can be entirely contained within the housing 20 so that the inner volume of the housing is not exposed to the elements of the atmosphere. The heat sink 40 provides for thermal management of the lighting assembly 50 without the need for any ventilation (forced or otherwise) of the inner volume of the housing 20, which would expose the components of the lighting assembly to the elements of the atmosphere. The use of the heat sink 40 can eliminate the need for additional and costly components typically used in thermal management of electronic components, such as fans.

The heat sink 40 can have a non-planar or non-flat shape, such as having a raised middle portion 45 and outer portions 47. In one embodiment, the heat sink 40 is not in direct contact with the lighting assembly 50 but remains in thermal communication with the lighting assembly. However, the present disclosure contemplates one or more portions of the heat sink 40 being in direct contact with the lighting assembly 50. The raised middle portion 45 can be substantially axially aligned with the lighting assembly 50. The outer portions 47 can be flush with a wall of the housing 20. In such a configuration, the leading edge of the middle portion 45 is closer to the lighting assembly 50 than outer portions 47 of the heat sink 40. This configuration can facilitate heat transfer away from the lighting assembly 50, such as from the middle portion 45 to the outer portions 47. In another embodiment, the heat sink 40 can be a pair of heat sinks having raised middle portions 45 that are axially aligned with the lighting assembly, and which are positioned on opposite walls of the housing 20 (e.g., on the inner surface of the cover 25 and on the wall opposite to the cover). In one embodiment, the positioning of the outer portions 47 flush with the wall of the housing 20 can provide for heat transfer from the heat sink 40 through the wall of the housing to the atmosphere, such as by forming the wall of the housing with a material having a high thermal conductivity, such as aluminum.

The present disclosure also contemplates other configurations of the heat sink 40 and other techniques for removing heat from the lighting assembly 50. In one embodiment, the heat sink 40 can be partially exposed to the atmosphere, such as through an opening in a wall of the housing 20 through which a portion of the heat sink is inserted and sealed therein, so that heat can dissipate to the atmosphere while the inner volume of the housing remains sealed. In another embodiment, the heat sink 40 can be a plurality of heat sinks disposed in various positions in the inner volume of the housing 20 in order to dissipate the heat from the lighting assembly 50.

The heat sink 40 can be made from various materials or combinations of materials to facilitate heat transfer. The heat sink 40 can have a high heat transfer coefficient and high thermal conductivity, such as aluminum or aluminum alloys. Other materials can also be used, including thermally conductive ceramic materials. In one embodiment, the heat sink 40 can have a low thermal coefficient of expansion so that the thermal communication from the lighting assembly 50 does not impart too high of a stress on the wall of the housing 20 to which the heat sink 40 is connected. The present disclosure also contemplates the use of a flexible connection (e.g., screws inserted through slots allowing for movement of the screws relative to the slots) between the heat sink 40 and the housing 20 so that any thermal expansion of the heat sink does not damage the housing.

The lighting assembly can include a fiber head 60, a fiber connector 70, a fiber ferrule 80, a fiber lens 90, an integrated circuit (e.g., a Printed Circuit (PC) board 100), and an Light Emitting Diode (LED) engine 150. The fiber head 60 can have a first end extending through an opening in a wall of the housing 20 (into the inner volume of the housing) and a second end protruding from the wall of the housing. The fiber head 60 can have a channel 62 therethrough for receiving a fiber optic line or cable. The particular size and shape of the fiber head 60 can be chosen based upon a number of factors, including the particular fiber optic cable being used. The first end of the fiber head 60 can have threads 65 or other connecting structure so that the fiber connector 70 can be connected to the fiber head. The fiber connector 70 can have arms or projections 72 that connect with retaining clips 75 positioned along the outer face of the housing 20 to position and retain the fiber head 60 with respect to the housing 20. Other connecting structure and techniques are also contemplated by the present disclosure, including directly connecting the fiber head 60 with the wall of the housing 20, such as through threads 65. The use of the fiber connector 70 and the retaining clips 75 facilitates the assembly and removal of the fiber head 60 with the housing 20 (e.g., quick-connect or not requiring use of a tool), while maintaining a strong and well-sealed connection.

Figures 7A, 7B:
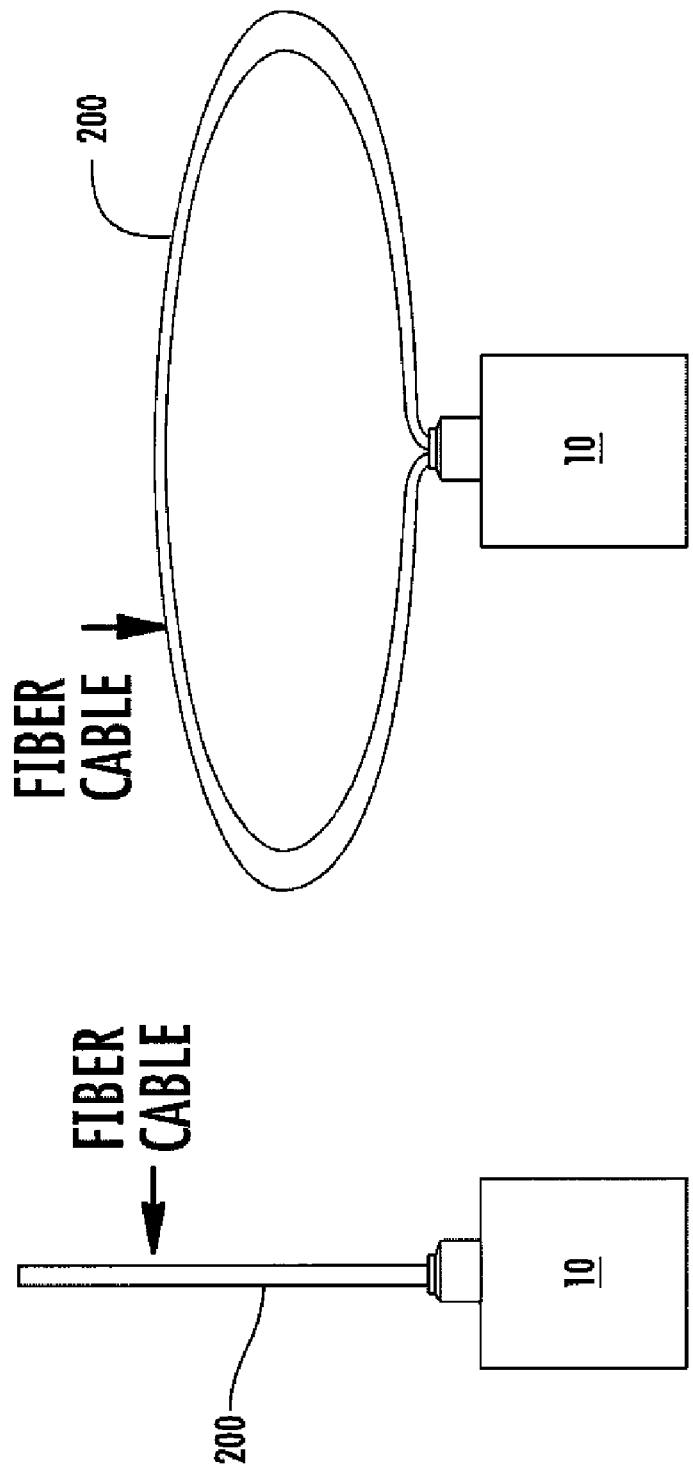
FIG. 7A is a schematic illustration of the light source of FIG. 1 coupled to a fiber optic cable according to the inventive arrangements.
FIG. 7B is another schematic illustration of the light source of FIG. 1 coupled to a fiber optic cable according to the inventive arrangements.

The fiber ferrule 80 can be connected to the end of the fiber optic cable and positioned in the first end of the fiber head 60 to securely connect the fiber optic cable with the lighting assembly 50. The connection of the fiber ferrule 80 with the fiber optic cable can be by various techniques, including adhesive. The fiber optic coupling with the light source 10 can be various configurations including the straight run as shown in FIG. 7A, or the loop or double pump as shown in FIG. 7B. The fiber ferrule 80 can have a channel 85 therethrough to allow for passage of light from the LED engine 150 to the fiber optic cable. A fiber lens 90 can be positioned between the LED engine 150 and the fiber optic cable (e.g., at a first end of the fiber ferrule 80 by partial insertion in channel 85) to focus the light from the LED engine.

The PC board 100 can be operably connected to the LED engine 150, a power supply and/or a controller for providing one or both of power and control for the LED engine. In one embodiment, the PC board 100 regulates power for use by the LED engine 150 and provides light output control over the LED engine (e.g., varying color and/or timing). In one embodiment, the PC board 100 has a pre-determined control logic resulting in desired light output being generated by the LED engine 150. In another embodiment, the PC board 100 can be programmed to implement control resulting in desired light output being generated by the LED engine 150. In another embodiment, the PC board 100 is operably connected to an external controller (e.g., a DMX protocol controller), and can receive control signals from the external controller for application to the LED engine 150. The PC board 100 can include various components to power and/or control the LED engine 150, including voltage regulators, logic switches, microcontrollers, temperature sensors, thermostats, and analog-to-digital (AD) converters.

In one embodiment, the LED engine 150 can be manufactured by combining high brightness LEDs with a multilayer low temperature co-fired ceramic on metal (LTCC-M). The LTCC-M can allow multiple LEDs to be densely clustered to achieve high luminous intensity in a small array. Any number of LEDs can be used, and any suitable LED array or light engine can be employed for the LED engine 150. For example, the BL-4000 RGB light engine, which is available from Lamina Ceramics of Westhampton, N.J., has a single cavity with six LEDs, evenly divided among red, green, and blue LEDs for optimal color uniformity. Other LED engines can also be used, such as the BL-3000 RGB light engine also available from Lamina Ceramics, which has 39 cavities that are each populated with multiple LEDs. Each cavity can contain multiple red, green and blue LED dies for optimal color uniformity.

In one embodiment, an individual LED array can comprise a metal composite base, a plurality of LEDs, ceramic layers with at least one having electrical traces thereon, and lenses. The LEDs can be mounted directly to the metal composite base, which can be a nickel-plated, copper-molybdenum-copper composite, or any suitable metal composite. The base can be formed of a single metal such as copper or aluminum, which are traditionally used for packaging LEDs, but a metal composite, such as the nickel-plated, copper-molybdenum-copper composite used in the example LED light engine 150 has been found to have a thermal coefficient of expansion that is similar to the typical LED chip material. This similarity can provide compatibility of the LED and substrate through a lifetime of heating and cooling as the LEDs are powered on and off, and can reduce mechanical stress caused by the expansion and retraction created during heating and cooling cycles of the light source 10.

Figure 8:
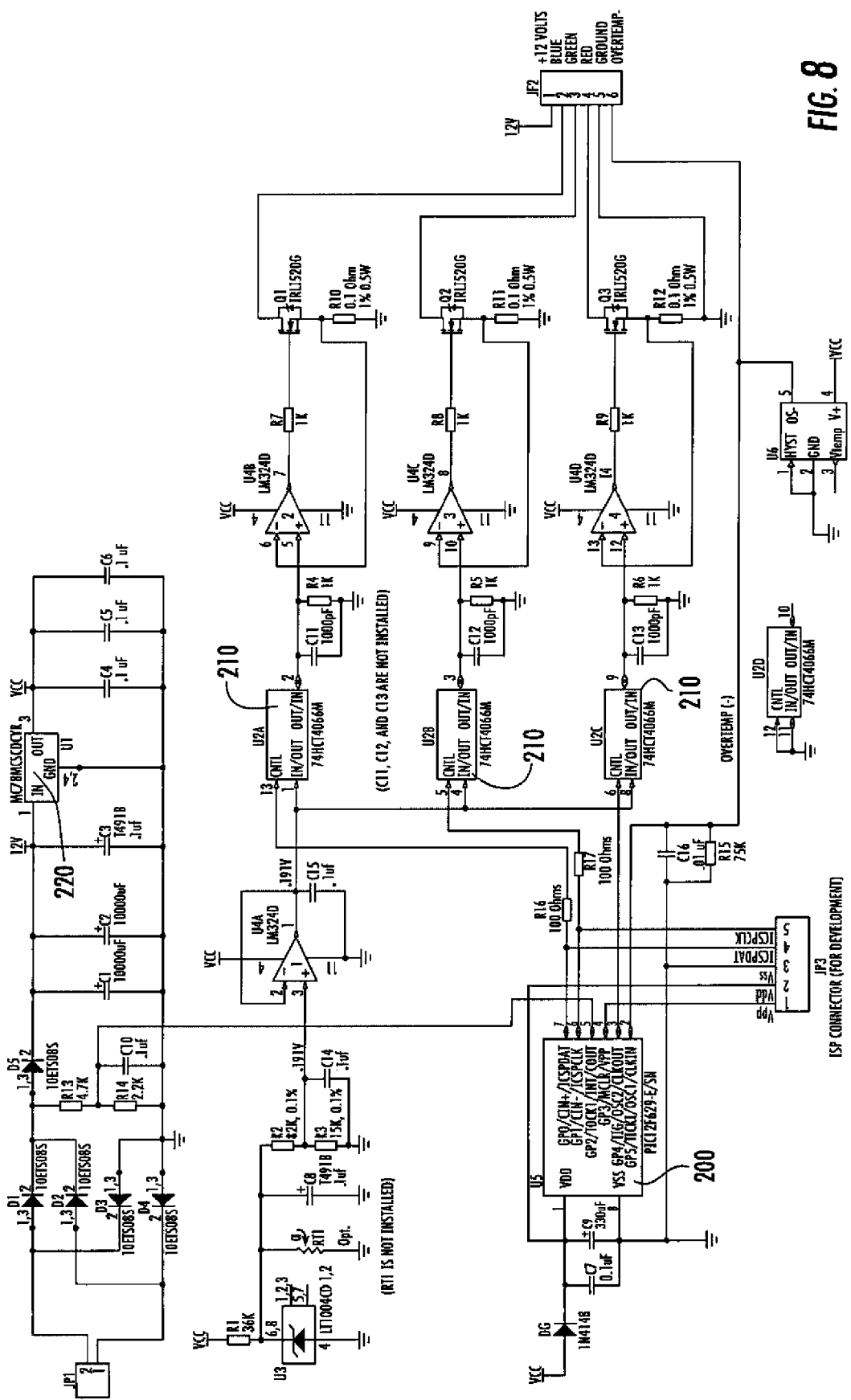
FIG. 8 is a schematic illustration of a circuit for an LED light engine that can be used with the light source of FIG. 1 according to the inventive arrangements.
Figure 9:
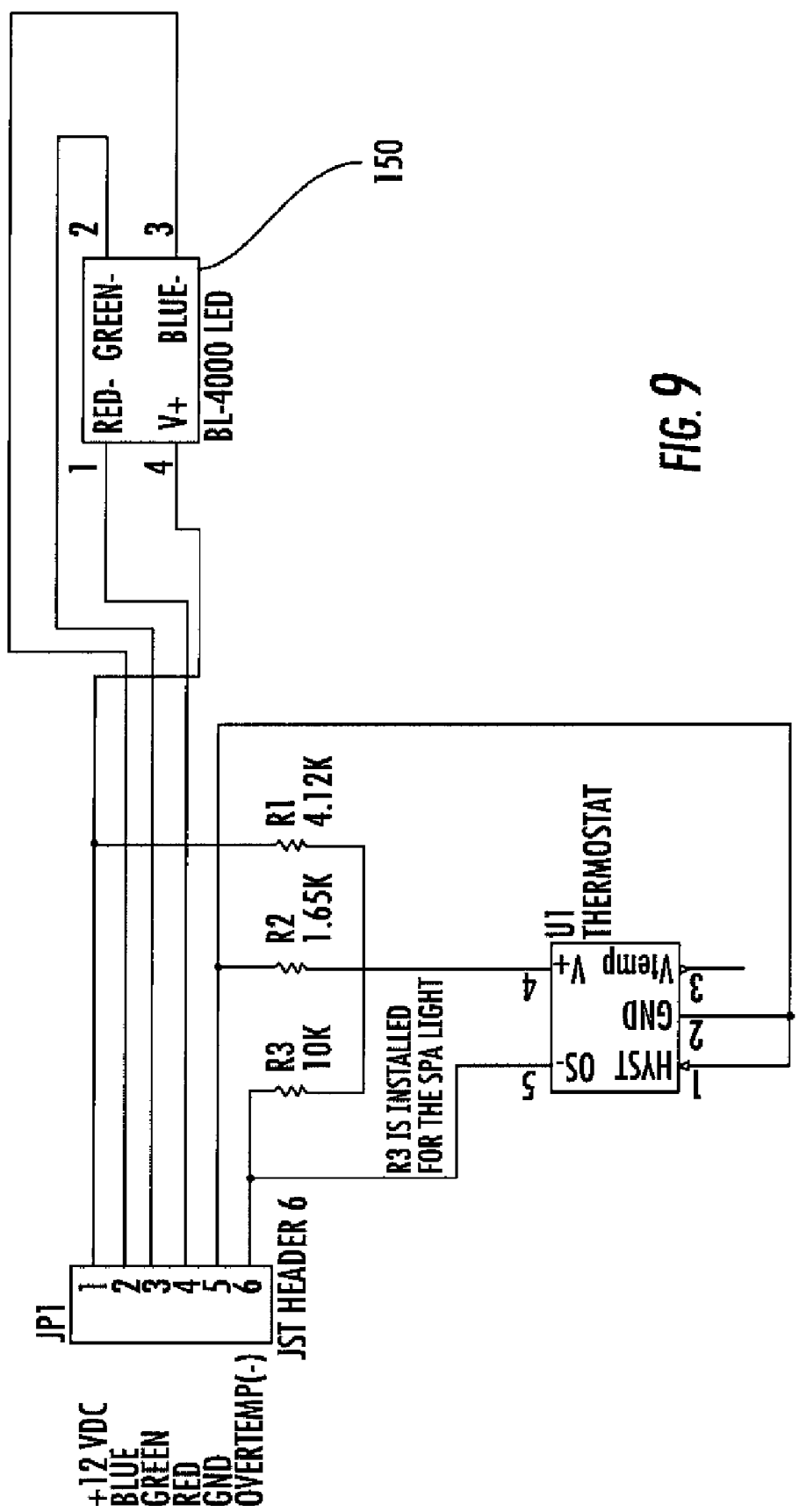
FIG. 9 is a schematic illustration of another circuit for an LED light engine that can be used with the light source of FIG. 1 according to the inventive arrangements.
Figure 10:
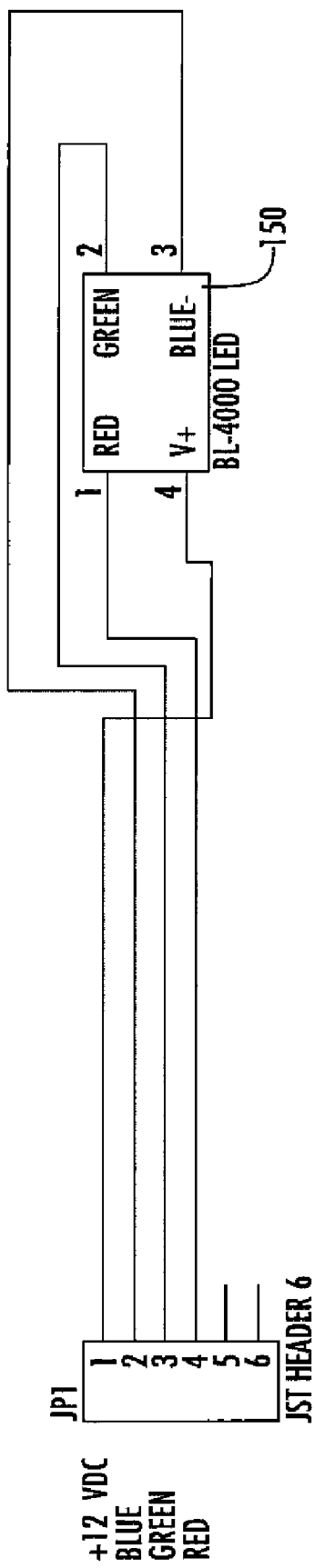
FIG. 10 is a schematic illustration of another circuit for an LED light engine that can be used with the light source of FIG. 1 according to the inventive arrangements.
Figure 11:
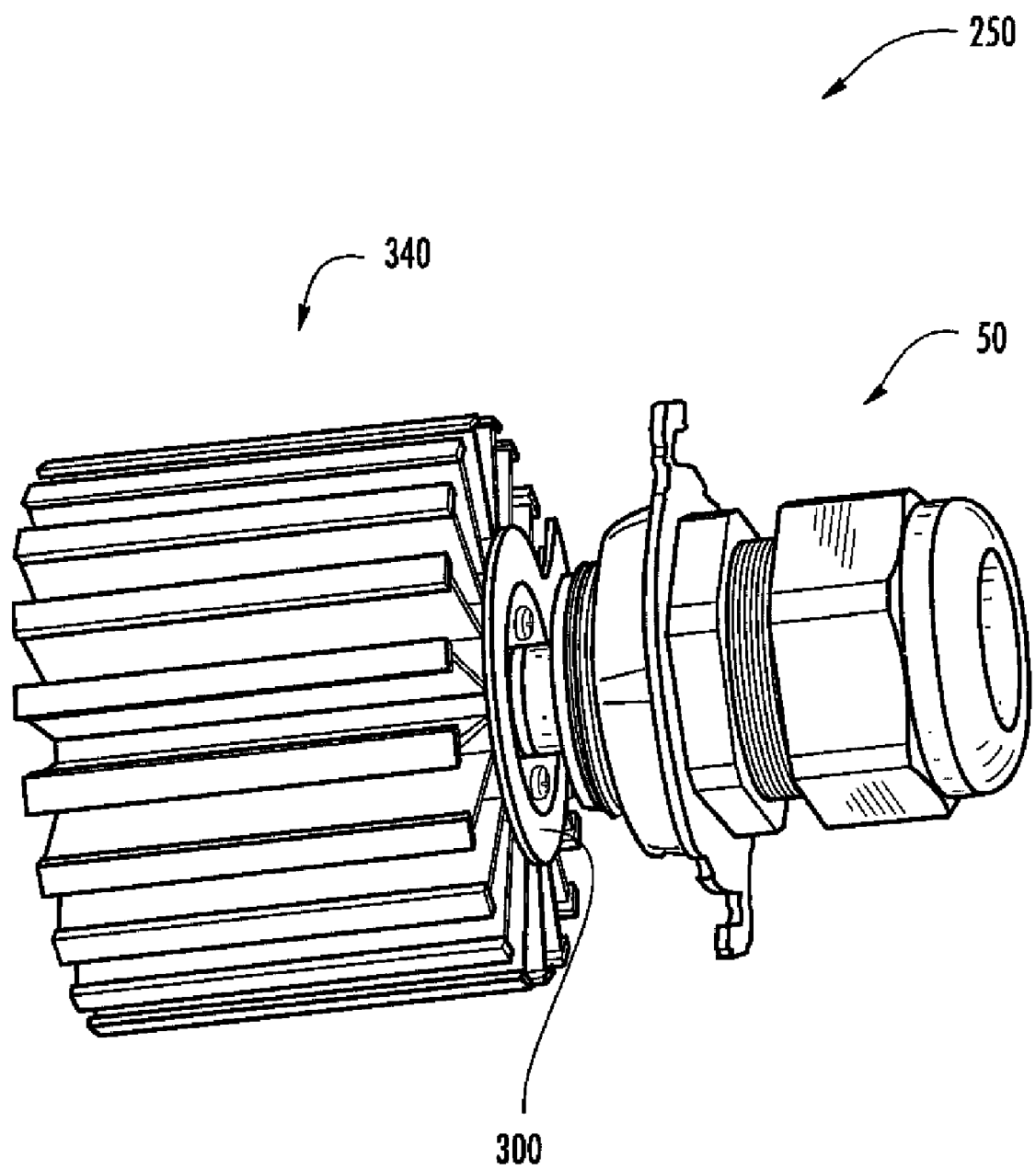
FIG. 11 is a perspective view of another light source for a fiber optic system according to the inventive arrangements.
Figure 12:
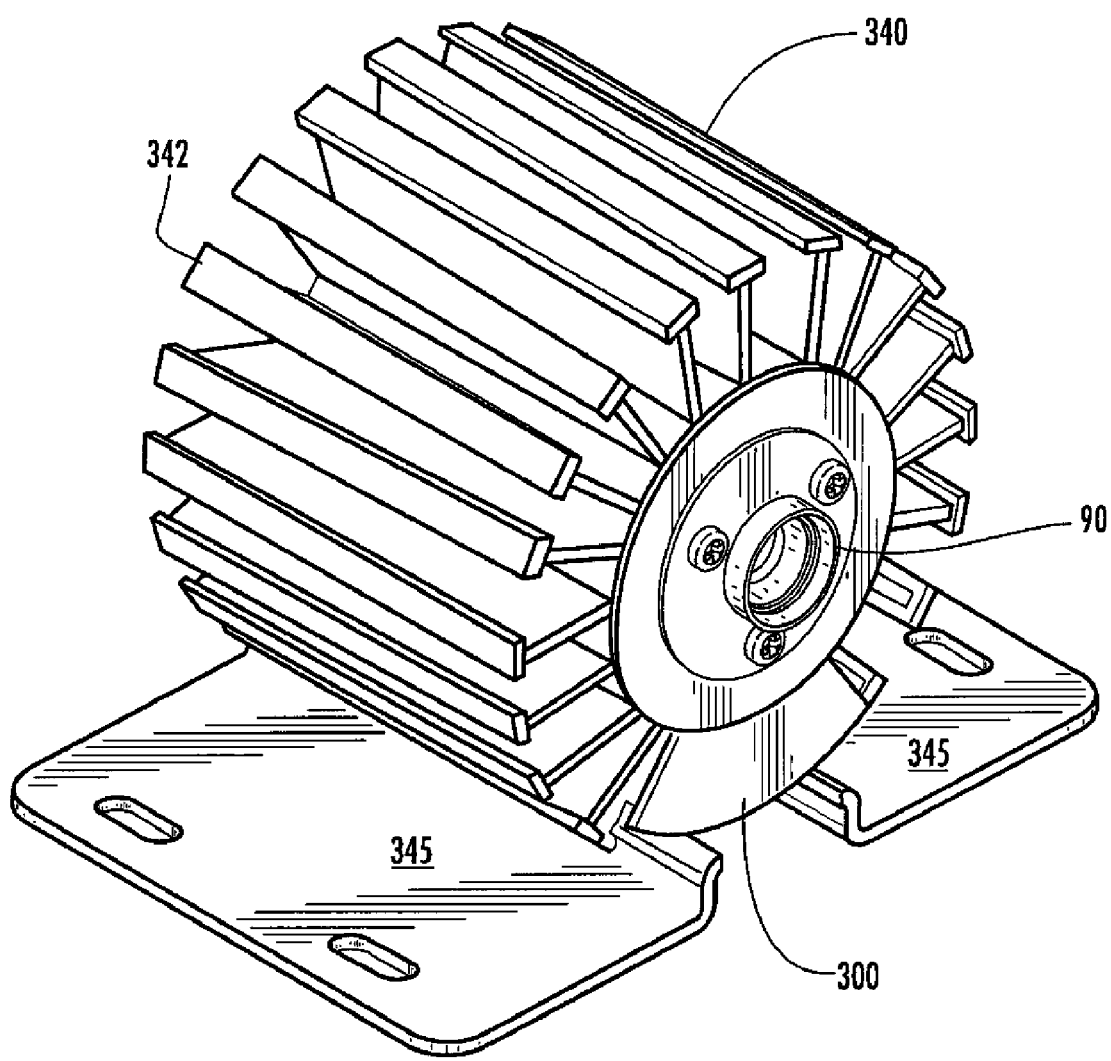
FIG. 12 is a perspective view of a portion of the light source of FIG. 11.

Various circuit configurations and components can be used for the light source 10. For example, one such circuit configuration is shown in FIG. 8 where a microcontroller 200, such as an 8-bit, 8-pin FLASH-based complimentary metal oxide semiconductor (CMOS) microcontroller, can be utilized for control of the LED engine 150. The microcontroller 200 can provide a high endurance FLASH/EEPROM cell with a 100,000 write FLASH endurance and with 1,000,000 write EEPROM endurance, which can provide a FLASH/Data EEPROM retention for more than 40 years. The microcontroller 200 can also provide programmable input multiplexing from device inputs. The microcontroller 200 can be coupled with one or more logic switches 210, such as a high speed CMOS logic quad bilateral switch. The high speed switch 210 can contain four independent digitally controlled analog switches that use silicon-gate CMOS technology to achieve operating speeds similar to low power Schottky transistor-to-transistor logic with the low power consumption of standard CMOS integrated circuits. Each switch can be turned on by a high-level voltage on its control input. Power can be regulated through use of a three terminal positive voltage regulator 220. As another exemplary circuit configuration, the LED engine 150 can be provided with or without temperature feedback as in FIGS. 9 and 10, respectively.

Referring to FIGS. 11-14, another LED light source according to an exemplary embodiment of the present disclosure is shown and generally represented by reference numeral 250. The light source 250 can have one or more components that are the same or similar to the components described above with respect to light source 10, which have been provided with the same reference numbers and the description of which will not be repeated.

The light source 250 can include a PC board 300, a heat sink 340 and a fastening bracket 345. The PC board 300 can include components and configurations as described above with respect to PC board 100 of light source 10, and can function as described above, including providing one or both of power and control for the LED engine 150. The heat sink 340 can have a cylindrical shape with a plurality of fins 342 extending radially therefrom. The radially extending fins 342 facilitate heat transfer away from the lighting assembly 50. The heat sink 340 can be in direct contact with the lighting assembly 50. Fastening brackets 345 can slideably engage the distal end of two of the fins 342 and can be connected to a wall of the housing 20 (shown in FIGS. 1-4). Other connecting structures and techniques are also contemplated for securing the heat sink 340 within a housing of the light source 250.

Referring to FIGS. 15-18, another LED light source according to an exemplary embodiment of the present disclosure is shown and generally represented by reference numeral 500. The light source 500 can have one or more components that are the same or similar to the components described above with respect to light source 10, which have been provided with the same reference numbers and the description of which will not be repeated.

The light source 500 can include housing 520, a portal or opening 530, a heat sink 540, a fiber head 560, and a PC board 600. The light source 500 and the heat sink 540 can have an elongated, cylindrical shape. The elongated shape of the heat sink 540 can facilitate heat transfer away from the LED engine 150. The portal 530 can be at an opposite end of the light source 500 from the fiber head 560. The portal 530 can provide an opening for insertion of a power and/or control line to the light assembly 50. A groove or channel can be formed in the heat sink 540 for positioning of the power and/or control line therein so that one or both of power and control can be provided to the light assembly. However, other openings may also be used for insertion of the power and/or control line (e.g., an opening formed through housing 520). The fiber head 560 can allow for insertion of the fiber optic cable therein so that light from the LED engine 150 can be communicated to and through the fiber optic cable. A fiber lens (not shown) can be utilized for focusing the light output generated by the LED engine 150. The PC board 600 can include one or more components and configurations as described above with respect to PC board 100 of light source 10, and can function as described above, including providing one or both of power and control for the LED engine 150. The heat sink 540 can be in direct contact with the lighting assembly 50.

Figure 19:
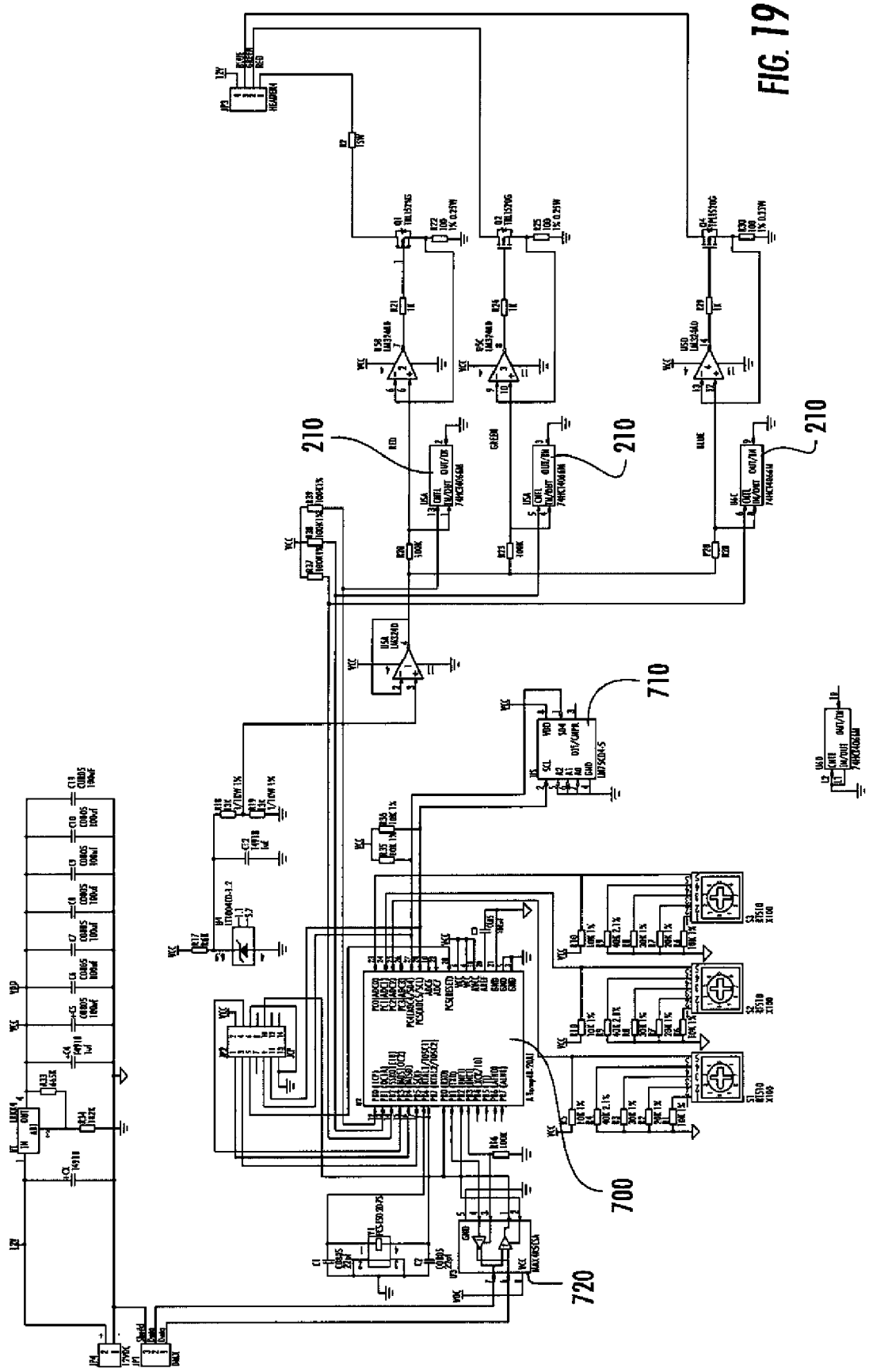
FIG. 19 is a schematic illustration of a circuit for an LED light engine that can be used with the light source of FIG. 15 according to the inventive arrangements.

Various circuit configurations and components can be used for the light source 10. For example, one such circuit configuration is shown in FIG. 19 where a microcontroller 700, such as an 8-bit microcontroller, can be utilized for control of the LED engine 150. The microcontroller 700 can be a low-power CMOS 8-bit microcontroller utilizing Reduced Instruction Set Computing (RISC) architecture. By executing powerful instructions in a single clock cycle, the microcontroller 700 can achieve throughputs approaching 1 MIPS per $MH_z$ which optimizes power consumption versus processing speed. The microcontroller 700 can provide 4K/8K/16K bytes of In-System Programmable Flash with Read-While-Write capabilities, 256/512/512 bytes EEPROM, 512/1K/1K bytes SRAM, 32 general purpose working registers, three flexible Timer/Counters with compare modes, internal and external interrupts, a byte-oriented 2-wire Serial Interface, an SPI serial port, and/or five software selectable power saving modes. The microcontroller 700 can be coupled to a temperature management device 710. The device 710 can be queried at any time to read temperature and the open-drain Overtemperature Shutdown (O.S.) output of the device 710 can become active when the temperature exceeds a programmable limit, with operation in either comparator or interrupt mode. The temperature alarm threshold ($T_{OS}$) and the temperature at which the alarm condition is removed ($T_{HYST}$) for the device 710 can be programmed. In addition, the contents of the $T_{OS}$ and $T_{HYST}$ registers from the device 710 can be externally accessible. The microcontroller 700 can also be coupled to a transceiver 720. The transceiver 720 can have reduced slew-rate drivers that minimize EMI and reduce reflections caused by improperly terminated cables, to provide for error-reduced or error-free data transmission, such as up to 250 kbps. The driver slew rates of the transceiver 720 can be unlimited, allowing them to transmit at high speeds, such as up to 2.5 Mbps. The drivers of the transceiver 720 can be short-circuit current limited and can be protected against excessive power dissipation by thermal shutdown circuitry that places the driver outputs into a high-impedance state. The receiver input of the transceiver 720 can have a fail-safe feature that provides a logic-high output if the input is open circuit. Power can be regulated through use of an adjustable three terminal linear regulator for high input voltage.

Figure 20:
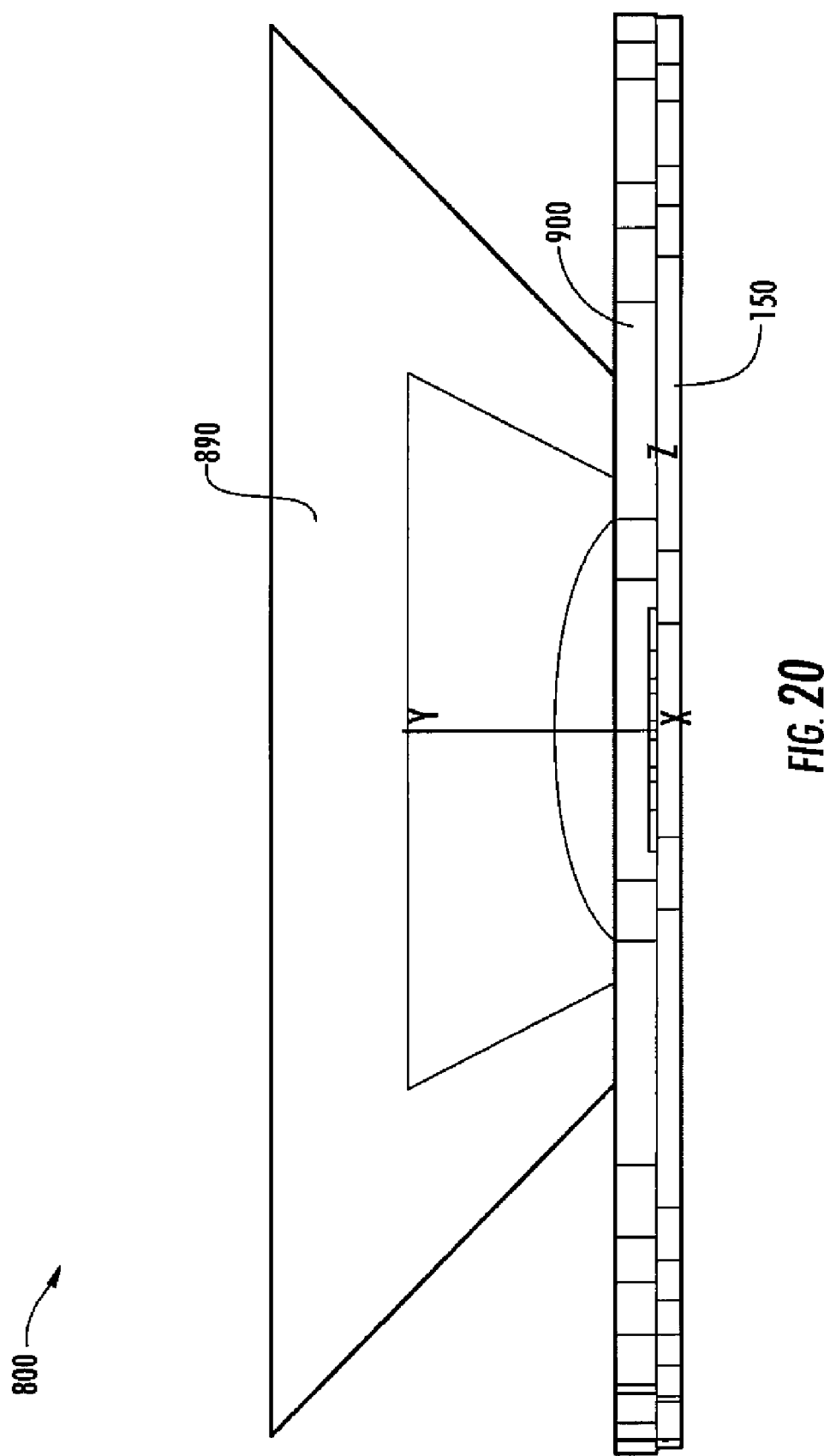
FIG. 20 is a cross-sectional view of a portion of a lighting assembly according to the inventive arrangements.
Figure 21:
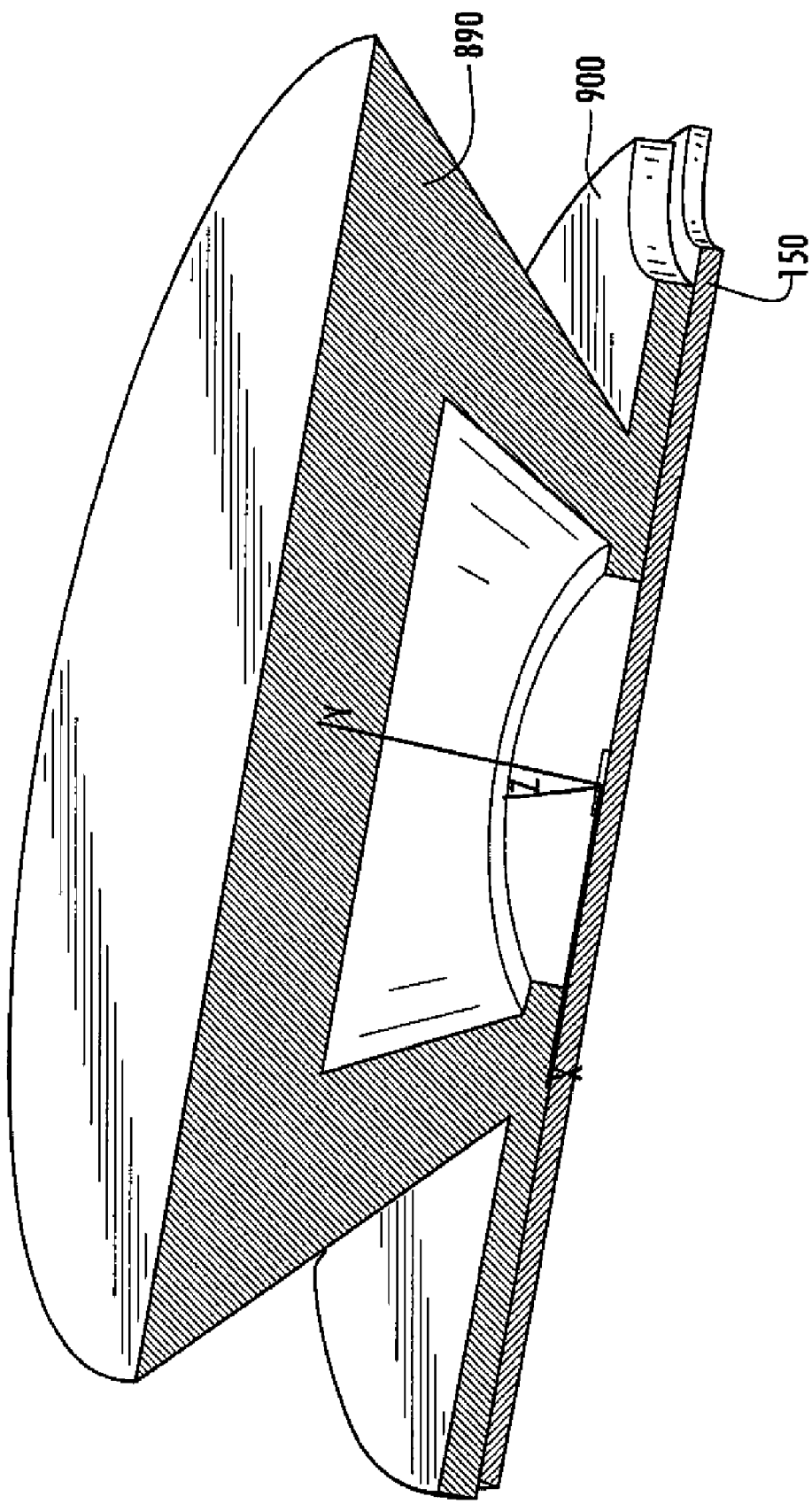
FIG. 21 is another cross-sectional view of the portion of the lighting assembly of FIG. 20.
Figure 22:
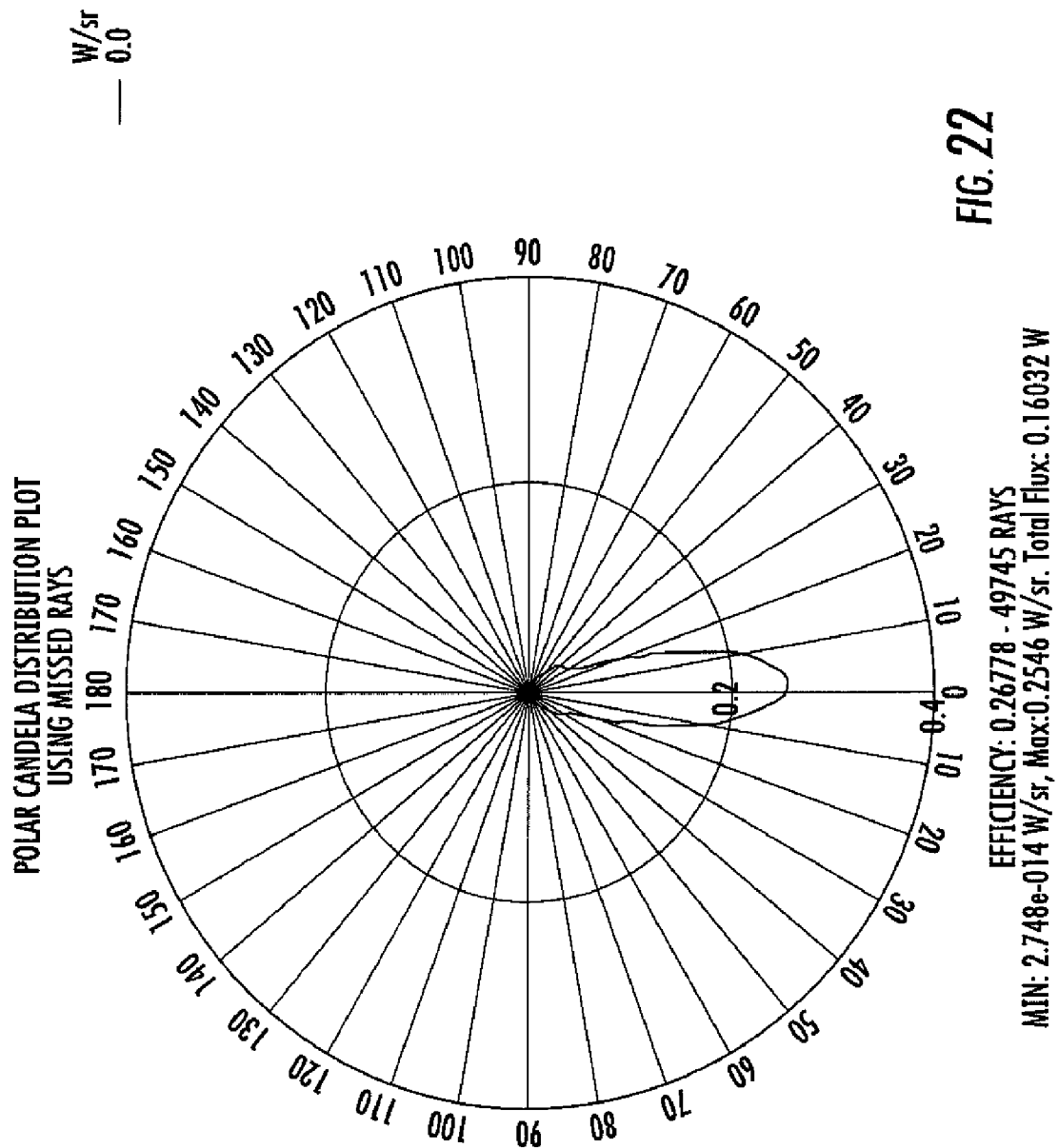
FIG. 22 is a polar candela distribution plot for the portion of the lighting assembly of FIG. 20.

Referring to FIGS. 20-21, a portion of another LED light source according to an exemplary embodiment of the present disclosure is shown and generally represented by reference numeral 800. The light source 800 can have one or more components that are the same or similar to the components described above with respect to light source 10, which have been provided with the same reference numbers and the description of which will not be repeated. The light source 800 can have the housings 20 or 520 described above, or can use other housings. The light source 800 can have a fiber lens 890, and a PC board 900 coupled between the lens and the LED engine 150. A polar candela plot illustrating the effect of the fiber lens 890 is shown in FIG. 22. The plot illustrates the distribution of light emitted from the LED engine 150 without being intercepted by the lens 890.

Referring to FIGS. 23-24, a portion of another LED light source according to an exemplary embodiment of the present disclosure is shown and generally represented by reference numeral 1000. The light source 1000 has some components that are the same or similar to the components described above with respect to light source 10, which have been provided with the same reference numbers and the description of which will not be repeated. The light source 1000 can have the housings 20 or 520 described above, or can have other housings. The light source 1000 can have a fiber ferrule 1180 and a fiber lens 1190. The light source 1000 can have a PC board 1200 coupled between the fiber lens 1190 and the LED engine 150. The ferrule 1180 can have a tapered shape to further focus the light emitted by the LED engine 150, in addition to the focusing performed by the lens 1190.

Figure 13:
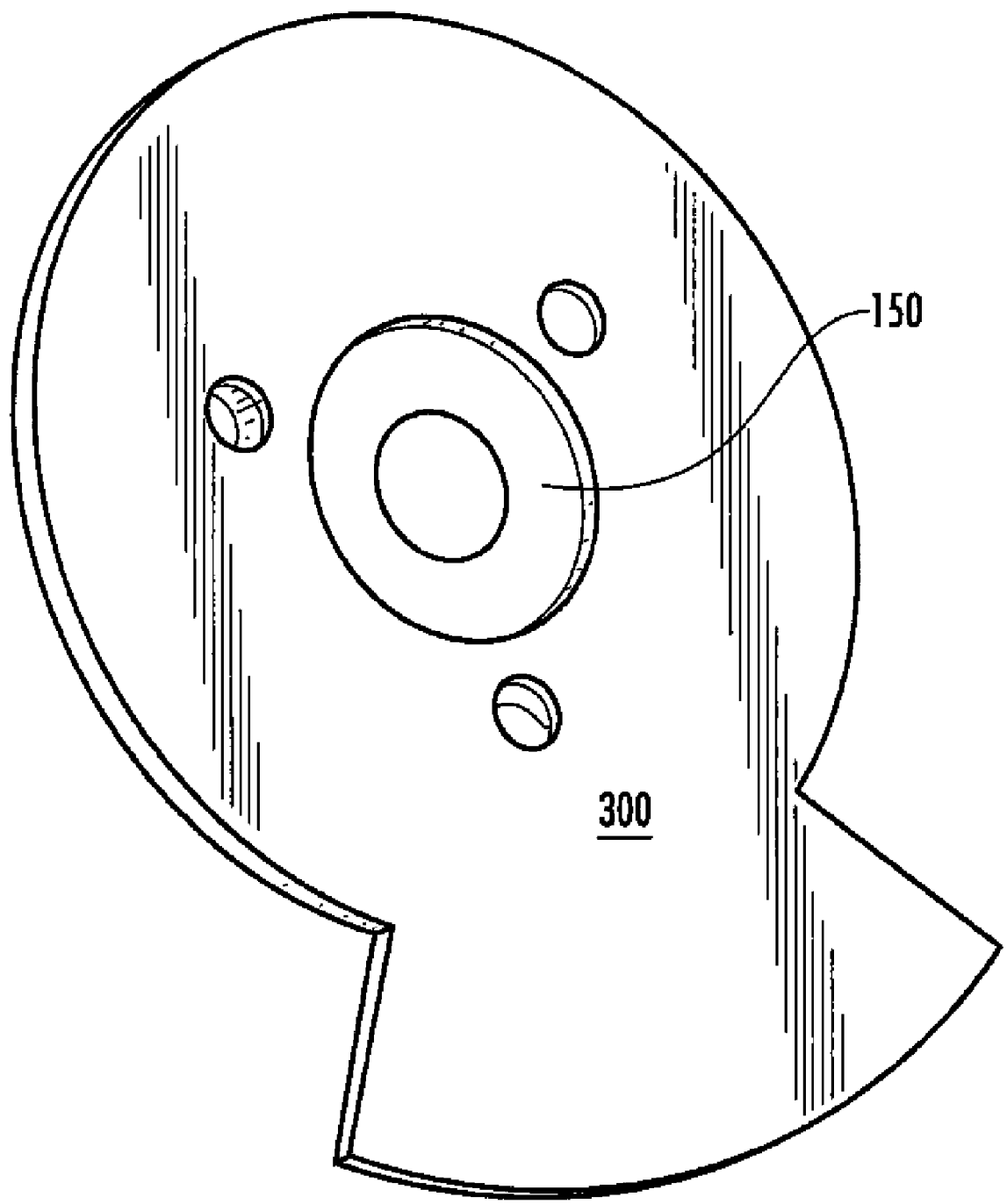
FIG. 13 is a perspective view of another portion of the light source of FIG. 11.
Figure 14:
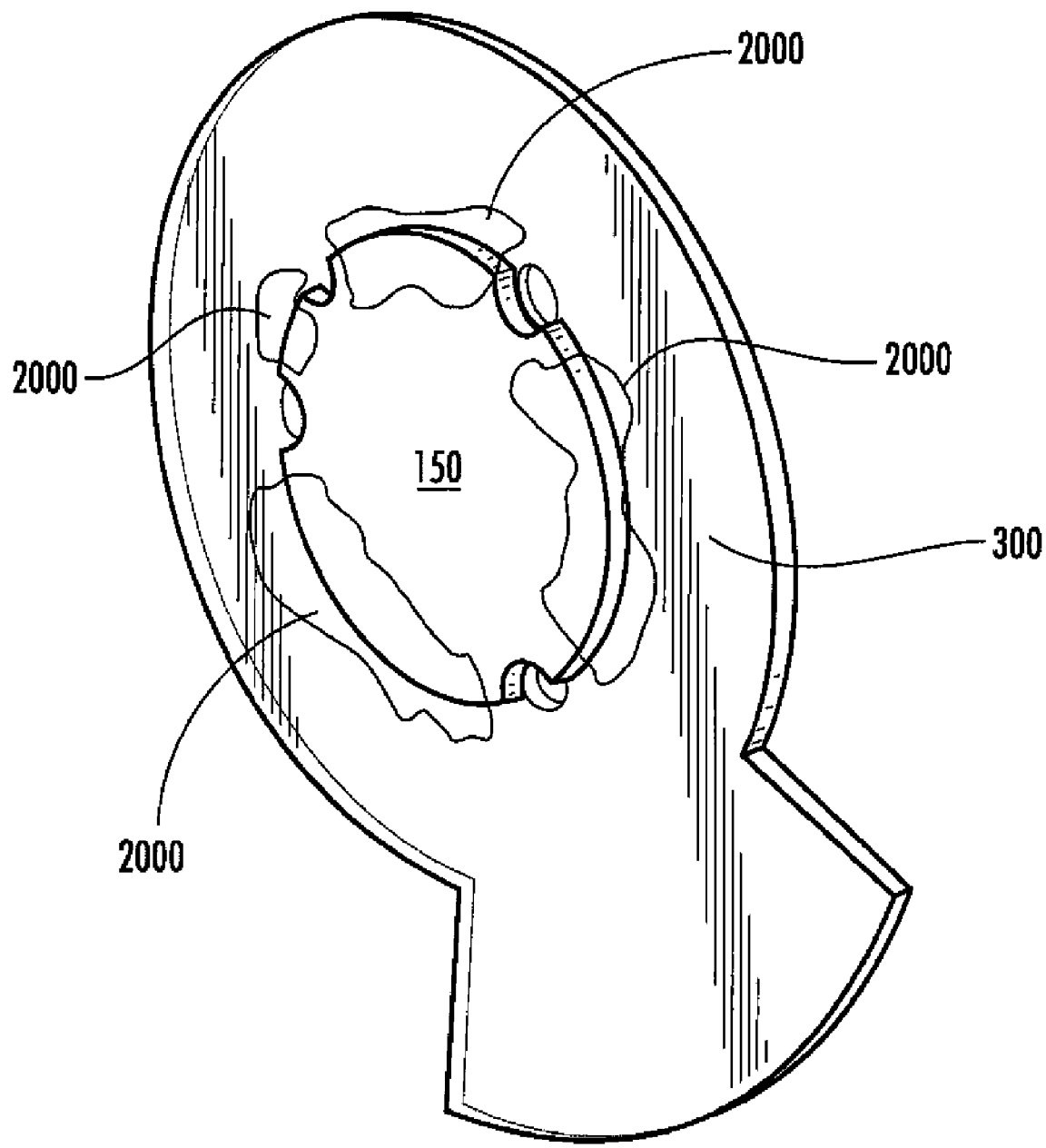
FIG. 14 is a rear perspective view of the portion of the light source of FIG. 13.
Figure 15:
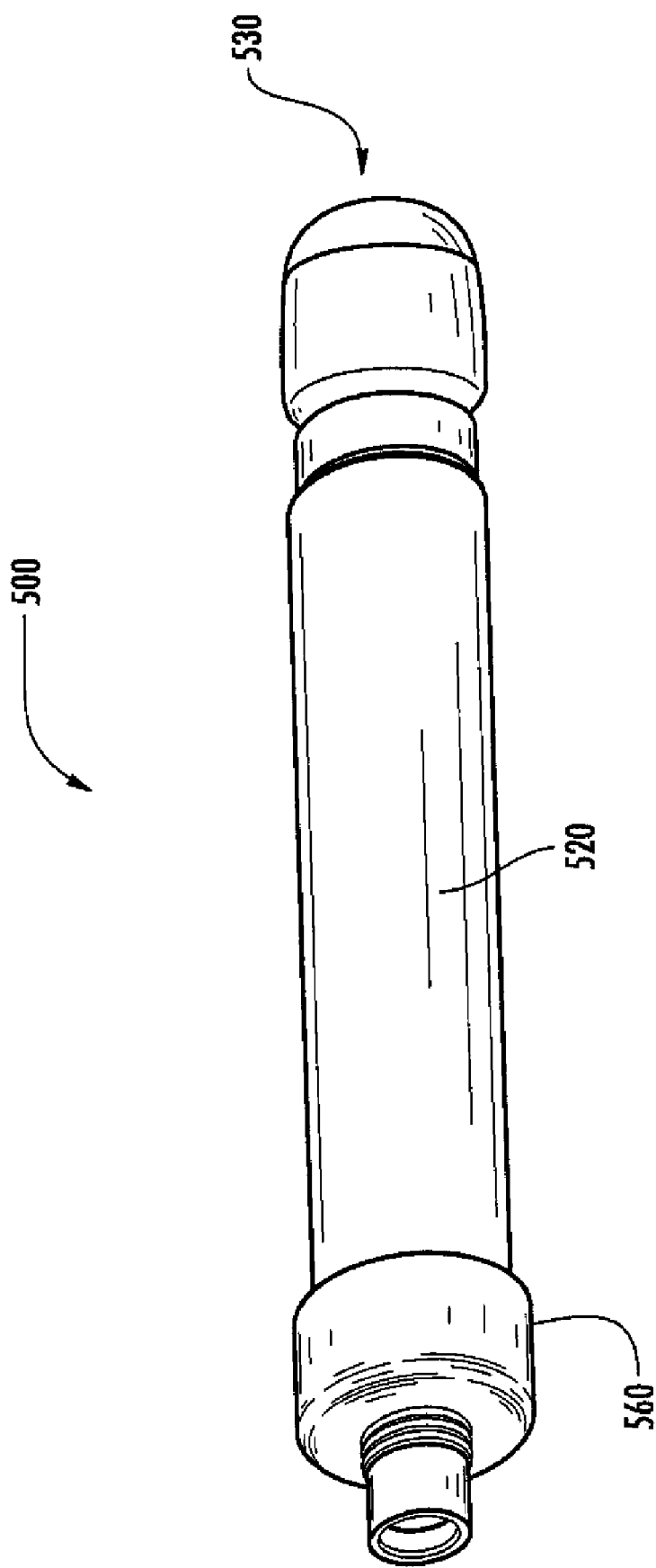
FIG. 15 is a perspective view of another light source for a fiber optic system according to the inventive arrangements.
Figure 16:
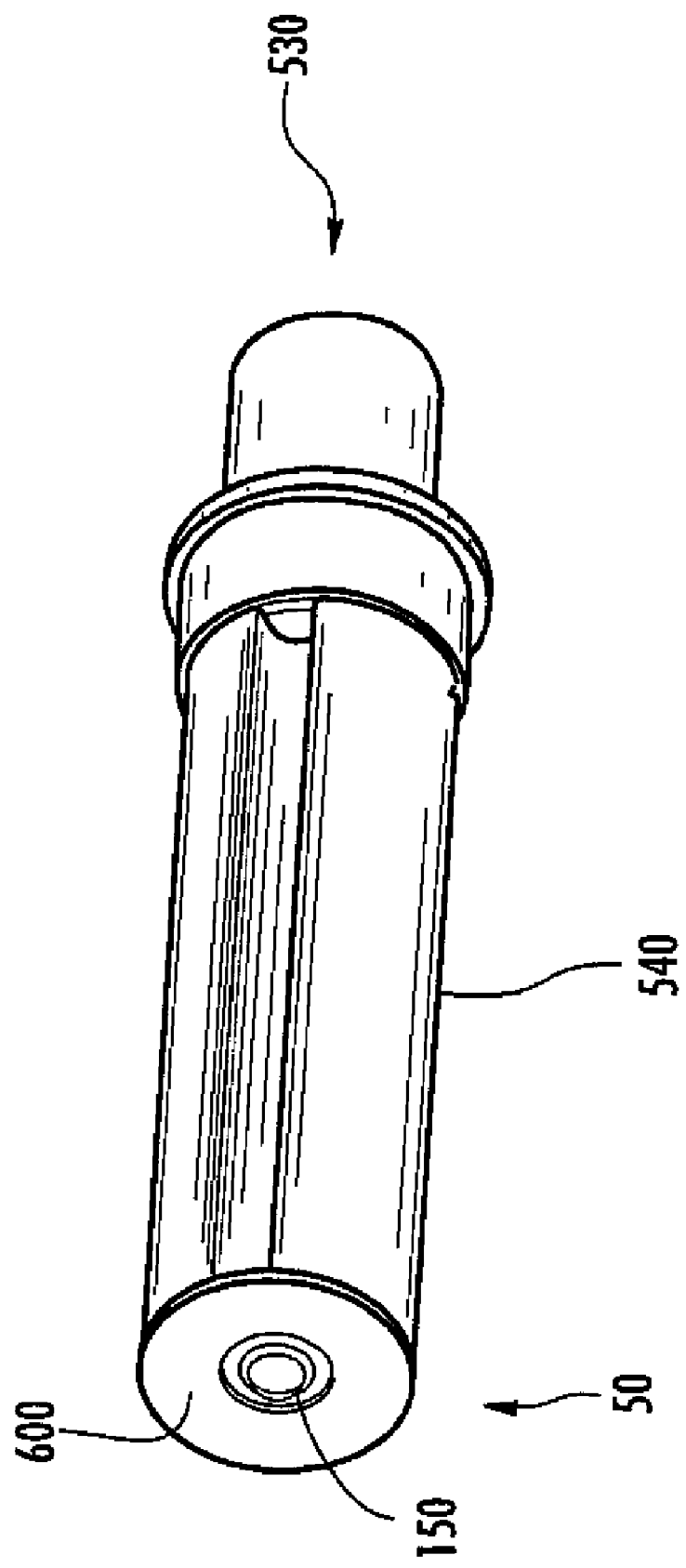
FIG. 16 is a perspective view of the light source of FIG. 15 with the housing removed.
Figure 17:
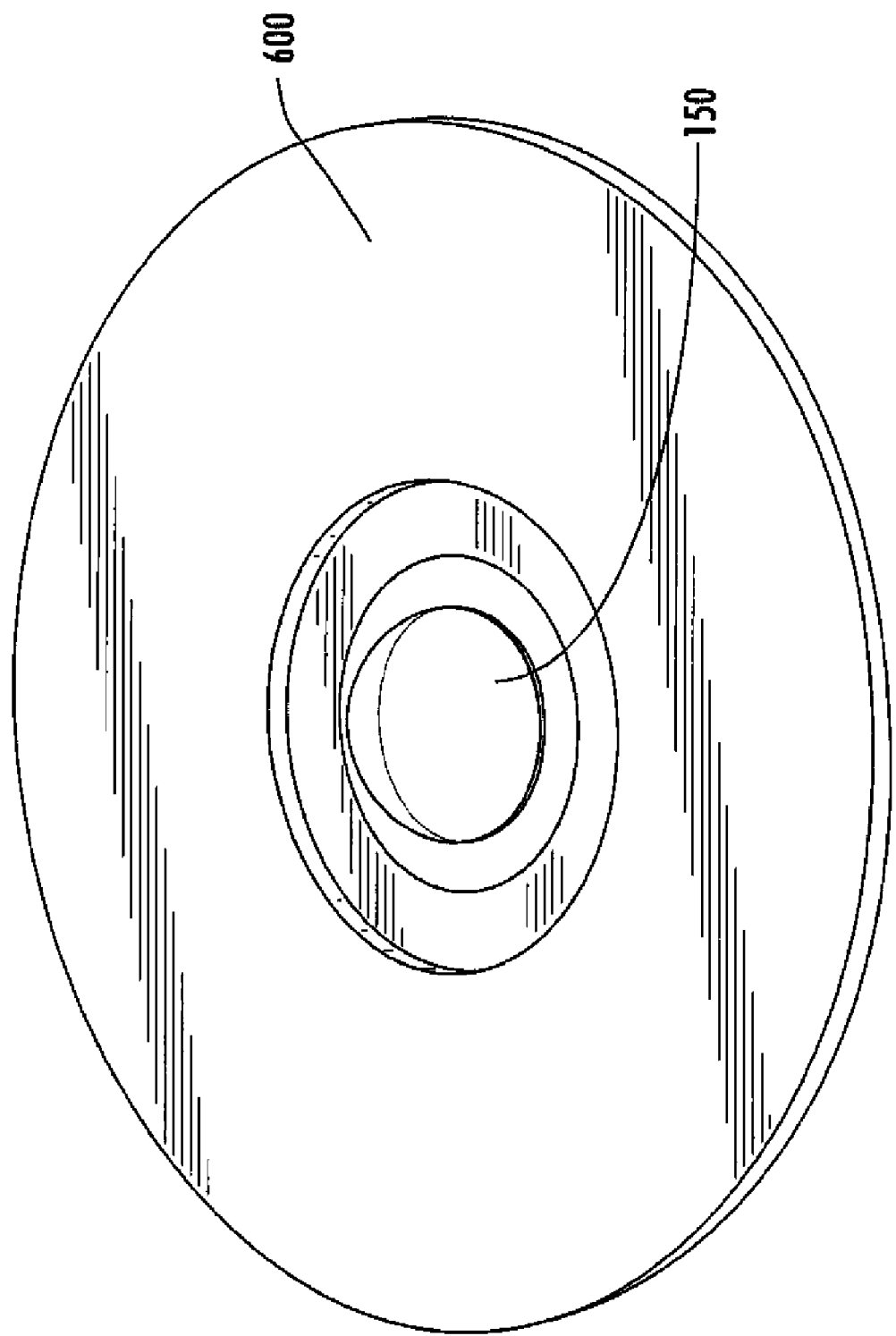
FIG. 17 is a perspective view of a portion of the light source of FIG. 16.

Additional materials can be positioned in proximity to the heat sink 40, 340 or 540 and in proximity to the LED engine 150 to facilitate the transfer of heat from the LED engine to the heat sink. In one embodiment, a thermal transfer and gap filler putty 2000 can be applied to the LED engine 150 and/or the heat sink 340 to improve heat transfer between the two, as shown in FIG. 13. The putty 2000 can be a soft silicone gel. For example, the putty 2000 can have a viscosity greater than 300,000 cP at 22° C., preferably greater than 500,000 cP at 22° C., and most preferably about 4,000,000 cP at 22° C. The high viscosity of the putty 2000 can decrease bleed, separation and pump-out, and can be applied by various means, including syringe, automated equipment and screen print. The putty 2000 can have a thermal conductivity greater than 1.0 W/mK, preferably greater than 1.5 W/mK, and most preferably about 1.8 W/mK. The particular positioning of the putty 2000 can be varied to improve the heat transfer from the LED engine 150 to the heat sink 340, as well as to fill gaps in or between the LED engine 150 and/or the heat sink 340.

Figure 18:
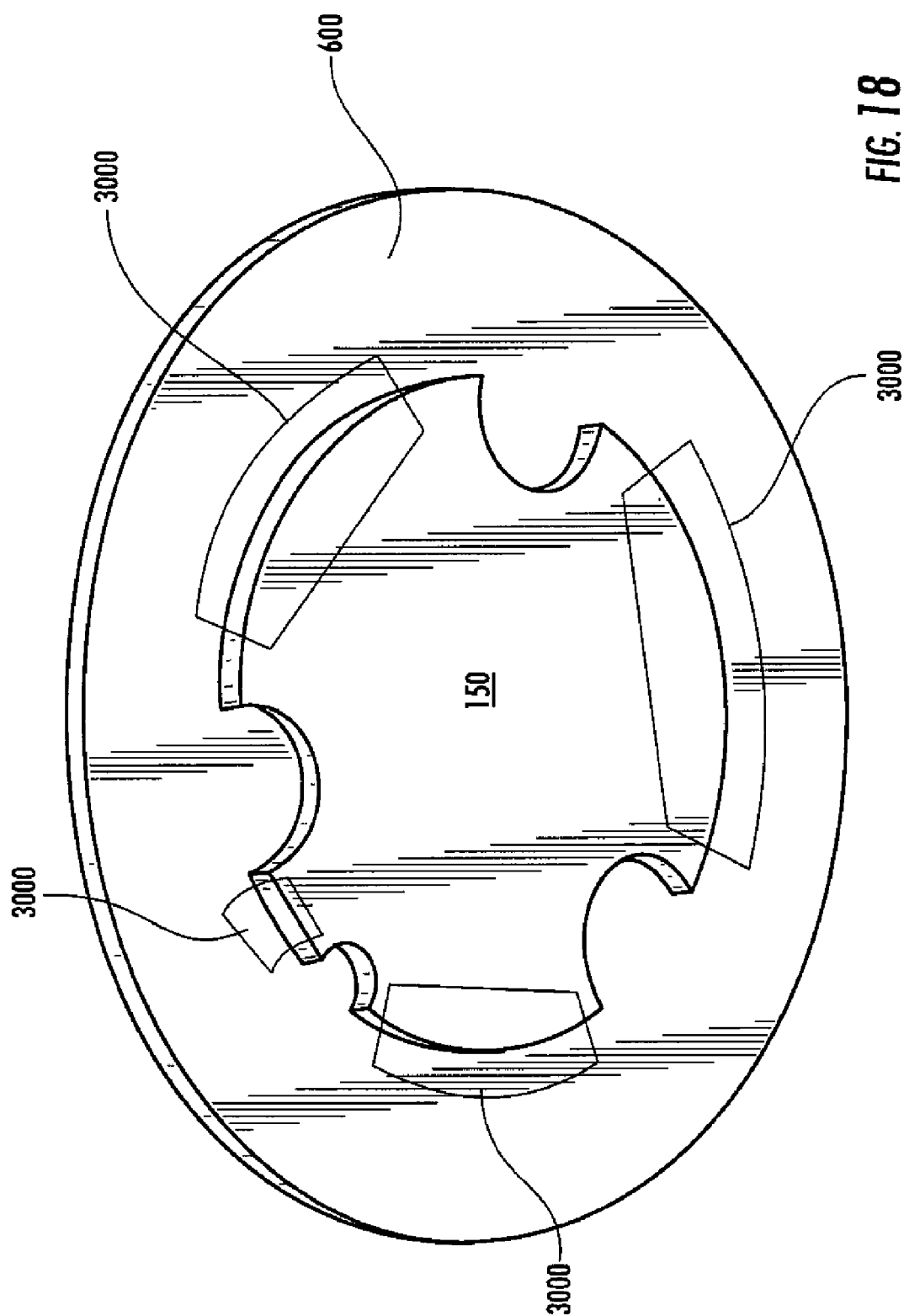
FIG. 18 is a rear perspective view of the portion of the light source of FIG. 17.

In another embodiment, a thermal transfer and gap filler pad 3000 can be applied to the LED engine 150 and/or the heat sink 540 to improve heat transfer between the two, as shown in FIG. 18. The pad 3000 can be a flexible silicone pad, For example, the pad 3000 can have a Shore OO hardness of less than 55, more preferably between about 48 to 53, and most preferably about 48. The flexibility of the pad 3000 allows the pad to conform to irregular shapes in the LED engine 150 and/or the heat sink 540 to increase thermal contact areas. The pad 3000 can have a thermal conductivity greater than 1.0 W/mK, preferably between about 1.2 to 6.0 W/mK, and most preferably about 1.2 W/mK. The particular positioning of the pad 3000 can be varied to improve the heat transfer from the LED engine 150 to the heat sink 540, as well as to fill gaps in or between the LED engine 150 and/or the heat sink 540. The present disclosure also contemplates the use of other heat transfer materials alone or in combination with one or more of the putty 2000 and the pad 3000, including thermal grease and/or thermal tape.

As used herein, the LED engine 150 can collect light from the LED, and deliver the light to a target, such as the fiber optic cable, which can be used by the target or can be reformatted, such as improving spatial, angular and/or spectral uniformities of the light. Additionally, the LED engine 150 can feature one or more LEDs, which can all be a single color or can be various colors. The fiber optic cables can also be used to supply other targets with light. In one embodiment, a plurality of LED light sources can be used to provide light output to one or more fiber optic cables or other targets (e.g., two or more light sources that communicate light output to a single fiber optic cable such as through a light merging device).

The light sources described with respect to the exemplary embodiments of the present disclosure can be in communication with a control console (not shown) operating a lighting network in compliance with various protocols, such as the DMX512, DMX512/1990 or DMX512-A protocols, or any extensions thereof. These protocols can specify the transmission voltages, the data rate, the format of the data content, the type of cable and the type of connector to be used. The DMX protocols additionally can be used to specify the color of the light output by the LED engine 150, which can change over time or in a programmed sequence to give a pleasing effect from the light fixture.

In at least one arrangement of the exemplary embodiments, the light source can be configured to respond to an electrical signal generated by a user activating and deactivating the light source using an electrical switch to cut off the light source from the power supply. In at least one arrangement, a standard outlet voltage of 120 VAC can be used to power and control one or more light sources that are using the LED engine 150. However, in other arrangements, the light source that is using the LED engine 150 can be used with lower voltage systems, such as 12V and 24V systems, without the use of an internal transformer, allowing some flexibility in design or installation. In one embodiment, multiple light sources can be connected to a common power supply, allowing a user to adjust the multiple light sources simultaneously.

In arrangements where certain intervals of disruption of power generate electrical power signal patterns, the light sources or external controllers can be further configured to associate at least some of the generated signal patterns with instructions or actions to adjust the light output of the LED engine 150. For example, an interruption of power for 1 to 5 seconds can be associated with a first instruction; an interruption of 6 to 9 seconds can be associated with a second instruction; and so forth. Such instructions can include, but are not limited to, increasing or decreasing the overall illumination intensity of the LED engine 150, adjusting the color of an RGB light engine, adjusting the rate of change of light output of the engine, or resetting the light output of the LED engine to a default setting or memory. The particular pre-determined interval utilized by the signal patterns can be chosen to facilitate pattern recognition. The pre-determined interval of time can be pre-set or can be user controlled. The present disclosure also contemplates the use of two or more interruption time intervals being used for a signal power signal pattern.

In some arrangements, the light source or external controller can be further configured to include a memory element for storing multiple settings for the LED engine 150. Where such a memory element is provided, the instructions can also include signaling the LED engine 150 to switch from one light engine setting in the memory element to another, or signaling to automatically change between light engine settings in the memory element randomly or according to a predefined order.

The exemplary embodiments described herein can use zero crossing counting techniques to control the light sources, although other techniques are contemplated by the present disclosure including the use of RC timing circuits. The control methodology described herein with respect to the LED engine(s) 150 of the light source(s) can provide for changing of a lighting pattern between synchronous and non-synchronous as well as resetting of one or more of the light sources based upon the use of a single light switch.

In the embodiments of the invention discussed above, various processors and controllers can be implemented in numerous ways, such as with dedicated hardware, or using one or more processors (e.g., microprocessors) that are programmed using software (e.g., microcode) to perform the various functions discussed above. Similarly, storage devices can be implemented in numerous ways, such as, but not limited to, RAM, ROM, PROM, EPROM, EEPROM, CD, DVD, optical disks, floppy disks, magnetic tape, and the like.

For purposes of the present disclosure, the term "LED" refers to any diode or combination of diodes that is capable of receiving an electrical signal and producing a color of light in response to the signal. Thus, the term "LED" as used herein should be understood to include light emitting diodes of all types (including semi-conductor and organic light emitting diodes), semiconductor dies that produce light in response to current, light emitting polymers, electro-luminescent strips, and the like. Furthermore, the term "LED" may refer to a single light emitting device having multiple semiconductor dies that are individually controlled. It should also be understood that the term "LED" does not restrict the package type of an LED; for example, the term "LED" may refer to packaged LEDs, non-packaged LEDs, surface mount LEDs, chip-on-board LEDs, and LEDs of all other configurations. The term "LED" also includes LEDs packaged or associated with other materials (e.g., phosphor, wherein the phosphor may convert radiant energy emitted from the LED to a different wavelength).

For purposes of the present disclosure, the term "light output" should be understood to refer to the production of a frequency (or wavelength) of radiation by an illumination source (e.g., a light source) or the intensity of an illumination source. Furthermore, as used herein, the term "color" should be understood to refer to any frequency (or wavelength) of radiation within a spectrum; namely, "color" refers to frequencies (or wavelengths) not only in the visible spectrum, but also frequencies (or wavelengths) in the infrared, ultraviolet, and other areas of the electromagnetic spectrum.

Similarly, for purposes of the present disclosure, the term "pool" or "spa" is used herein to describe a type of water feature that is particularly designed for a variety of entertainment, recreational, therapeutic purposes and the like. Some other commonly used terms for a spa include, but are not limited to, "hot-tub" and "whirlpool bath." Generally, a pool or spa may include a number of accessory devices, such as one or more heaters, blowers, jets, circulation and filtration devices to condition water in the water feature, as well as one or more light sources to illuminate the water therein. For purposes of the present disclosure, it also should be appreciated that a water feature as described above may be divided up into one or more sections, and that one or more of the water feature sections can be particularly adapted for use with a spa or a pool.

While the exemplary embodiments describe differentiating signals based upon interruptions of power, it should be understood that signal differentiation can be based on other power parameters such as changes in voltage and/or current. These parameters can be recognized by the controller of the lighting assembly 50 or the external controller, and can result in varying responses by the light sources. The present disclosure also contemplates different parameters being used in combination with each other to establish electrical power signal patterns that are recognizable by the controller of the lighting assembly 50 or the external controller.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

What is claimed is:

1. A lighting system comprising:
  a light source having a housing, an LED engine, a controller, a heat sink, a connection device, and a power cable opening, wherein the LED engine, controller and heat sink are enclosed by the housing and sealed from atmosphere, wherein the heat sink is in thermal communication with the LED engine, wherein the controller is connected to a power cable inserted through the power cable opening, and wherein the controller controls at least one of power to the LED engine and a light output generated by the LED engine; and
  a fiber optic cable connected to the LED engine by the connection device, wherein the LED engine communicates the light output through the fiber optic cable.

2. The system of claim 1, wherein the heat sink is not directly connected to the LED engine.

3. The system of claim 1, further comprising thermal putty positioned in proximity to the LED engine and the heat sink, wherein the thermal putty has a viscosity greater than 300,000 cP at 22° C., and wherein the thermal putty has a thermal conductivity greater than 1.0 W/mK.

4. The system of claim 1, further comprising a thermal pad positioned in proximity to the LED engine and the heat sink, wherein the thermal putty has a Shore OO Hardness less than 55, and wherein the thermal pad has a thermal conductivity greater than 1.0 W/mK.

5. The system of claim 1, wherein the heat sink has a non-planar shape comprising a raised portion and a flush portion, and wherein the raised portion is closer to the LED engine than the flush portion.

6. The system of claim 1, wherein the controller controls the power to the LED engine and the light output generated by the LED engine.

7. The system of claim 1, wherein the light source has a fiber lens in proximity to the LED engine, and wherein the fiber lens focuses the light output generated by the LED engine.

8. The system of claim 1, wherein the connection device comprises a fiber head with a head channel therethrough, a fiber connector, and a fiber ferrule with a ferrule channel therethrough, wherein the fiber optic cable is positioned entirely through the head channel, wherein the fiber optic cable is positioned at least partially through the ferrule channel, and wherein the fiber connector fastens the fiber optic cable to the housing.

9. The system of claim 8, wherein the light source has a fiber lens in proximity to the LED engine, wherein the fiber lens focuses the light output generated by the LED engine, and wherein the finer lens is positioned partially through the ferrule channel.

10. The system of claim 8, wherein the fiber connector comprises a plurality of projections that engage with corresponding retaining clips along an outer surface of the housing.

11. The system of claim 1, wherein the heat sink is directly connected to the LED engine, and wherein the heat sink has a cylindrical shape with a plurality of radially extending fins.

12. The system of claim 11, wherein the light source has one or more brackets that are connected to an inner surface of the housing, and wherein the one or more brackets each slideably connect with a distal end of a corresponding one of the plurality of radially extending tins.

13. The system of claim 1, wherein the light source has an elongated cylindrical shape, wherein the heat sink has an elongated cylindrical shape, wherein the light source has a first end with the connection device positioned thereon, and wherein the light source has a second end with the power cable opening therethrough.

14. The lighting system of claim 1, wherein the power cable opening is configured through the enclosed housing and maintaining a seal to the atmosphere.

15. A light source for a lighting system, the light source comprising:
  a housing, an LED engine, a controller, a heat sink, a fiber lens, a power cable opening, and a connection device, wherein the LED engine, controller, fiber lens and heat sink are enclosed by the housing, wherein the heat sink is in thermal communication with the LED engine, wherein the controller is connected to a power cable inserted through the power cable opening, wherein the controller controls at least one of power to the LED engine and a light output generated by the LED engine, wherein the LED engine and the fiber lens are connected to a fiber optic cable by the connection device, wherein the LED engine communicates the light output through the fiber optic cable, and wherein the fiber lens focuses the light output generated by the LED engine.

16. The light source of claim 15, wherein the controller controls the power to the LED engine and the light output generated by the LED engine.

17. The light source of claim 15, wherein the heat sink is not directly connected to the LED engine.

18. The light source of claim 15, wherein the heat sink has a non-planar shape comprising a raised portion and flush portion, and wherein the raised portion is closer to the LED engine than the flush portion.

19. The light source of claim 15, wherein the connection device comprises a fiber head with a head channel therethrough, a fiber connector, and a fiber ferrule with a ferrule channel therethrough, wherein the fiber optic cable is positioned entirely through the head channel, wherein the fiber optic cable is positioned at least partially through the ferrule channel, wherein the fiber lens is positioned partially through the ferrule channel, and wherein the fiber connector fastens the fiber optic cable to the housing.

20. The light source of claim 15, wherein the heat sink is directly connected to the LED engine, and wherein the heat sink has a cylindrical shape with a plurality of radially extending fins.

21. The light source of claim 15, further comprising a first end with the connection device positioned thereon and a second end with the power cable opening therethrough.

22. A method of providing light output for a lighting system, the method comprising:

enclosing and sealing an LED engine, a controller, a heat sink, and a fiber lens in a housing of a light source, wherein the heat sink is in thermal communication with the LED engine;

connecting a power cable to the controller through a power cable opening in the housing;

connecting a fiber optic cable to the LED engine and the fiber lens using a connection device extending outside of the housing; and controlling power to the LED engine and a light output generated by the LED engine, wherein the LED engine communicates the light output through the fiber optic cable, and wherein the fiber lens focuses the light output generated by the LED engine.

23. The method of claim 22, further comprising positioning the heat sink remote from the LED engine, wherein the heat sink dissipates heat produced by the LED engine, wherein the heat sink has a non-planar shape comprising a raised portion and a flush portion, and wherein the raised portion is closer to the LED engine than the flush portion.

* * * * *